(12) United States Patent
Yokota

(10) Patent No.: US 11,551,340 B2
(45) Date of Patent: Jan. 10, 2023

(54) IMAGE PROCESSING APPARATUS, IMAGING SYSTEM, MOBILE BODY, AND IMAGE PROCESSING METHOD

(71) Applicant: KYOCERA Corporation, Kyoto (JP)

(72) Inventor: Tadashi Yokota, Yamato (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/958,364

(22) PCT Filed: Jan. 7, 2019

(86) PCT No.: PCT/JP2019/000107
§ 371 (c)(1),
(2) Date: Jun. 26, 2020

(87) PCT Pub. No.: WO2019/142675
PCT Pub. Date: Jul. 25, 2019

(65) Prior Publication Data
US 2021/0073971 A1 Mar. 11, 2021

(30) Foreign Application Priority Data
Jan. 17, 2018 (JP) .............................. JP2018-005942

(51) Int. Cl.
*G06T 7/00* (2017.01)
*H04N 7/18* (2006.01)
(Continued)

(52) U.S. Cl.
CPC ........... *G06T 7/0002* (2013.01); *H04N 5/247* (2013.01); *H04N 7/18* (2013.01); *H05B 1/0236* (2013.01);
(Continued)

(58) Field of Classification Search
CPC ......... G06T 7/0002; G06T 2207/30168; G06T 2207/30268; G06T 2207/30252;
(Continued)

(56) References Cited

U.S. PATENT DOCUMENTS 8,553,088 B2 * 10/2013 Stein ........................ B60R 1/00
348/148
9,555,740 B1 * 1/2017 Zhu ........................ B60Q 9/008
(Continued)

FOREIGN PATENT DOCUMENTS

CN 106218587 A 12/2016
JP H02130455 A 5/1990
(Continued)

*Primary Examiner* — Susan E. Torgerson
(74) *Attorney, Agent, or Firm* — Studebaker & Brackett PC

(57) ABSTRACT

An abnormality in an imaging apparatus configured to generate an image or in an optical member located on an optical path for capturing the image can be accurately determined, irrespective of the environment. An image processing apparatus includes a first receiver configured to receive a first image, a second receiver configured to receive a second image having an imaging range that includes at least a portion of an imaging range of the first image, and a controller configured to determine an abnormality in the first image or the second image based on a common portion in the imaging ranges of the first image and the second image.

20 Claims, 12 Drawing Sheets

(51) Int. Cl.
  *H04N 5/247* (2006.01)
  *B60R 1/00* (2022.01)
  *H05B 1/02* (2006.01)
  *H05B 3/84* (2006.01)
  *B60S 1/56* (2006.01)
  *B60S 1/58* (2006.01)

(52) U.S. Cl.
  CPC ............... *H05B 3/84* (2013.01); *B60R 1/00* (2013.01); *B60R 2300/105* (2013.01); *B60R 2300/70* (2013.01); *B60S 1/56* (2013.01); *B60S 1/58* (2013.01); *G06T 2207/30168* (2013.01); *G06T 2207/30268* (2013.01)

(58) Field of Classification Search
  CPC .......... G06T 7/001; H04N 5/247; H04N 7/18; H04N 7/181; H04N 5/22521; H04N 17/002; H04N 5/2258; H05B 1/0236; H05B 3/84; B60R 1/00; B60R 2300/105; B60R 2300/70; B60S 1/56; B60S 1/58; G01N 2021/8887; G01N 2021/9586; G01N 21/958; G01N 21/94
  USPC ........................................... 348/148
  See application file for complete search history.

(56) References Cited

U.S. PATENT DOCUMENTS

| | | | |
|---|---|---|---|
| 9,718,405 B1* | 8/2017 | Englander | B60R 1/00 |
| 10,269,331 B2* | 4/2019 | Sato | B60K 35/00 |
| 10,306,149 B2 | 5/2019 | Kishi et al. | |
| 2011/0073142 A1* | 3/2011 | Hattori | B60S 1/56 |
| | | | 134/56 R |
| 2011/0187886 A1 | 8/2011 | Nakajima et al. | |
| 2013/0027557 A1* | 1/2013 | Hirai | G06V 20/56 |
| | | | 348/148 |
| 2013/0300869 A1* | 11/2013 | Lu | B60R 1/00 |
| | | | 348/148 |
| 2017/0064189 A1 | 3/2017 | Chikano et al. | |
| 2017/0142340 A1 | 5/2017 | Kishi et al. | |
| 2020/0302657 A1* | 9/2020 | Shimazu | G06T 11/001 |
| 2020/0317213 A1* | 10/2020 | Oba | B60W 50/0205 |

FOREIGN PATENT DOCUMENTS

| | | |
|---|---|---|
| JP | 2012228916 A | 11/2012 |
| JP | 2014043121 A | 3/2014 |
| JP | 2017049412 A | 3/2017 |
| JP | 2017092753 A | 5/2017 |

* cited by examiner

IMAGE PROCESSING APPARATUS, IMAGING SYSTEM, MOBILE BODY, AND IMAGE PROCESSING METHOD

CROSS REFERENCE TO RELATED APPLICATION

This application claims priority to and the benefit of Japanese Patent Application No. 2018-005942 filed on Jan. 17, 2018, the entire contents of which are incorporated herein by reference.

TECHNICAL FIELD

The present disclosure relates to an image processing apparatus, an imaging system, a mobile body, and an image processing method.

BACKGROUND

Conventionally, techniques of determining fogging of a windshield of a mobile body are proposed. For example, PTL 1 set forth below describes determination that a windshield is dirty or fogged, based on a brightness distribution of an image generated by imaging through the windshield. This technique activates an apparatus for defogging the windshield without an operation by a driver of the mobile body and thus increases the convenience for the driver.

CITATION LIST

Patent Literature

PTL 1: JP-A-02-130455

SUMMARY

An image processing apparatus of the present disclosure includes a first receiver, a second receiver, and a controller. The first receiver is configured to receive a first image. The second receiver is configured to receive a second image having an imaging range that includes at least a portion of an imaging range of the first image. The controller is configured to determine an abnormality in the first image or the second image based on a common portion in the imaging ranges of the first image and the second image.

An imaging system of the present disclosure includes a first imaging apparatus, a second imaging apparatus, and an image processing apparatus. The first imaging apparatus is configured to generate a first image. The second imaging apparatus is configured to generate a second image having an imaging range that includes at least a portion of an imaging range of the first image. The image processing apparatus includes a first receiver, a second receiver, and a controller. The first receiver is configured to receive a first image. The second receiver is configured to receive the second image. The controller is configured to determine an abnormality in the first image or the second image based on a common portion in the imaging ranges of the first image and the second image.

A mobile body of the present disclosure includes a first imaging apparatus, a second imaging apparatus, and an image processing apparatus. The first imaging apparatus is configured to generate a first image. A second imaging apparatus is configured to generate a second image having an imaging range that includes at least a portion of an imaging range of the first image. The image processing apparatus includes a first receiver, a second receiver, and a controller. The first receiver is configured to receive a first image. The second receiver is configured to receive the second image. The controller is configured to determine an abnormality in the first image or the second image based on a common portion in the imaging ranges of the first image and the second image.

An image processing method of the present disclosure is an image processing method performed by an image processing apparatus. The image processing apparatus is configured to receive a first image. The image processing apparatus is configured to receive a second image having an imaging range that includes at least a portion of an imaging range of the first image. The image processing apparatus is configured to determine an abnormality in the first image or the second image, based on a common portion in the imaging ranges of the first image and the second image.

DETAILED DESCRIPTION

A brightness distribution of an image generated by an imaging apparatus mounted in a mobile body greatly varies depending on a time zone, weather, a subject, or a surrounding environment such as illumination. That is, the brightness distribution of an image generated by the imaging apparatus mounted in the mobile body varies depending on some factors in addition to fogging of a windshield. Thus, it can be difficult to accurately determine whether it is fogged, based on the brightness distribution.

According to an embodiment of the present disclosure, an abnormality in an imaging apparatus configured to generate an image and in an optical member located on an optical path for imaging can be accurately determined, irrespective of the environment.

Hereinafter, a first embodiment of the present disclosure will be described with reference to the drawings.

Figure 1:
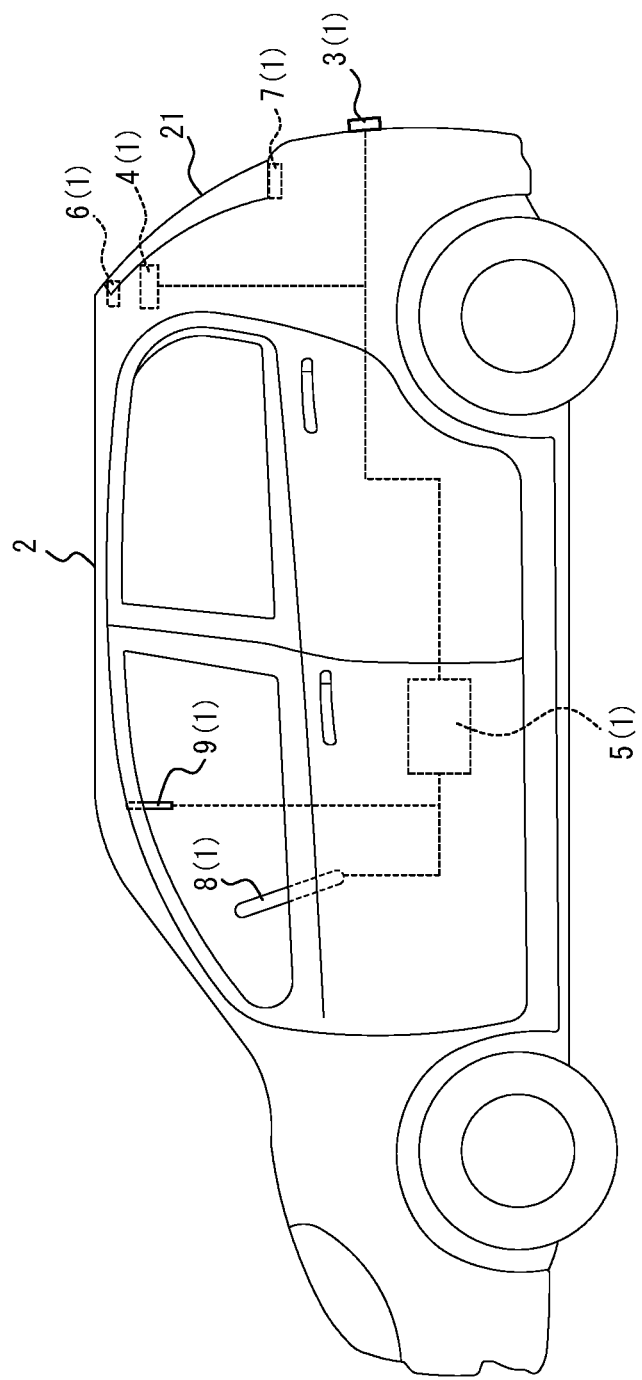
FIG. 1 is a diagram illustrating an example of a mobile body having an imaging system of an embodiment of the present disclosure incorporated therein.
Figure 2:
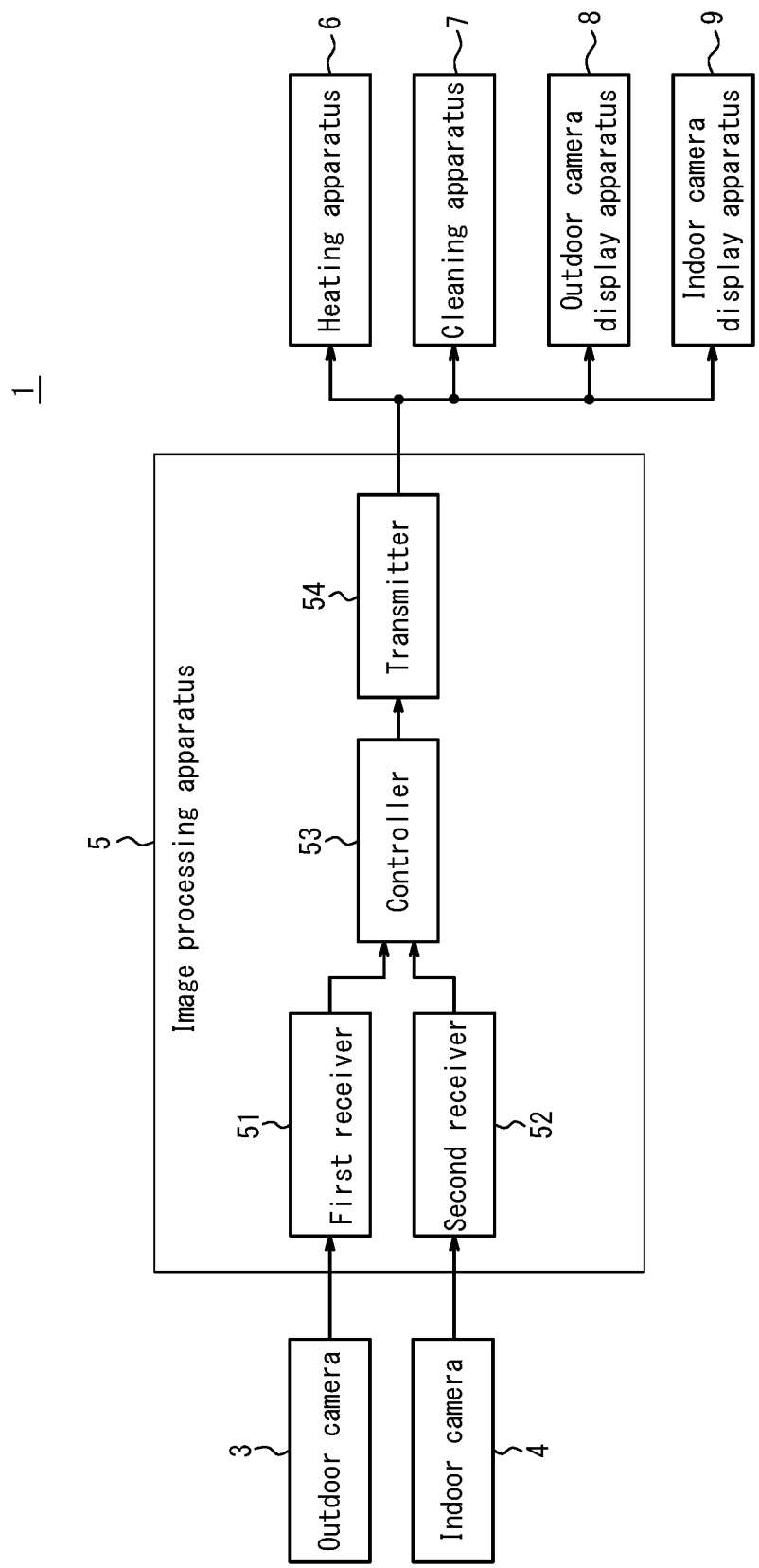
FIG. 2 is a functional block diagram illustrating an imaging system illustrated in FIG. 1.

An imaging system 1 according to the first embodiment of the present disclosure is incorporated in a mobile body 2, as illustrated in FIG. 1. The imaging system 1 includes an outdoor camera 3 serving as a first imaging apparatus, an indoor camera 4 serving as a second imaging apparatus, an image processing apparatus 5, a heating apparatus 6, a cleaning apparatus 7, an outdoor camera display apparatus 8 (a first display apparatus), and an indoor camera display apparatus 9 (a second display apparatus), as illustrated in FIG. 2. Hereinafter, each the outdoor camera 3 and the indoor camera 4 may be simply referred to as "imaging apparatus".

The outdoor camera 3 is attached to the exterior of the mobile body 2 to image outside of the mobile body 2. The outdoor camera 3 generates an image (a first image) by imaging an outdoor subject without passing through a windshield 21 of the mobile body 2. Hereinafter, the image generated by the outdoor camera 3 will be referred to as "outdoor image". The windshield 21 is an optical member that separates inside and outside of the mobile body 2 and transmits visible light. The windshield 21 may include a rear glass, a front glass, a side window, or the like. For example, the outdoor camera 3 may be a rear camera attached to the mobile body 2 to image a subject located on the rear side of the mobile body 2, as illustrated in FIG. 1. The outdoor camera 3 is not limited to the rear camera but may be a camera attached to the mobile body 2 to image a subject located on the front side, or on the left or right side, of the mobile body 2.

Figure 3:
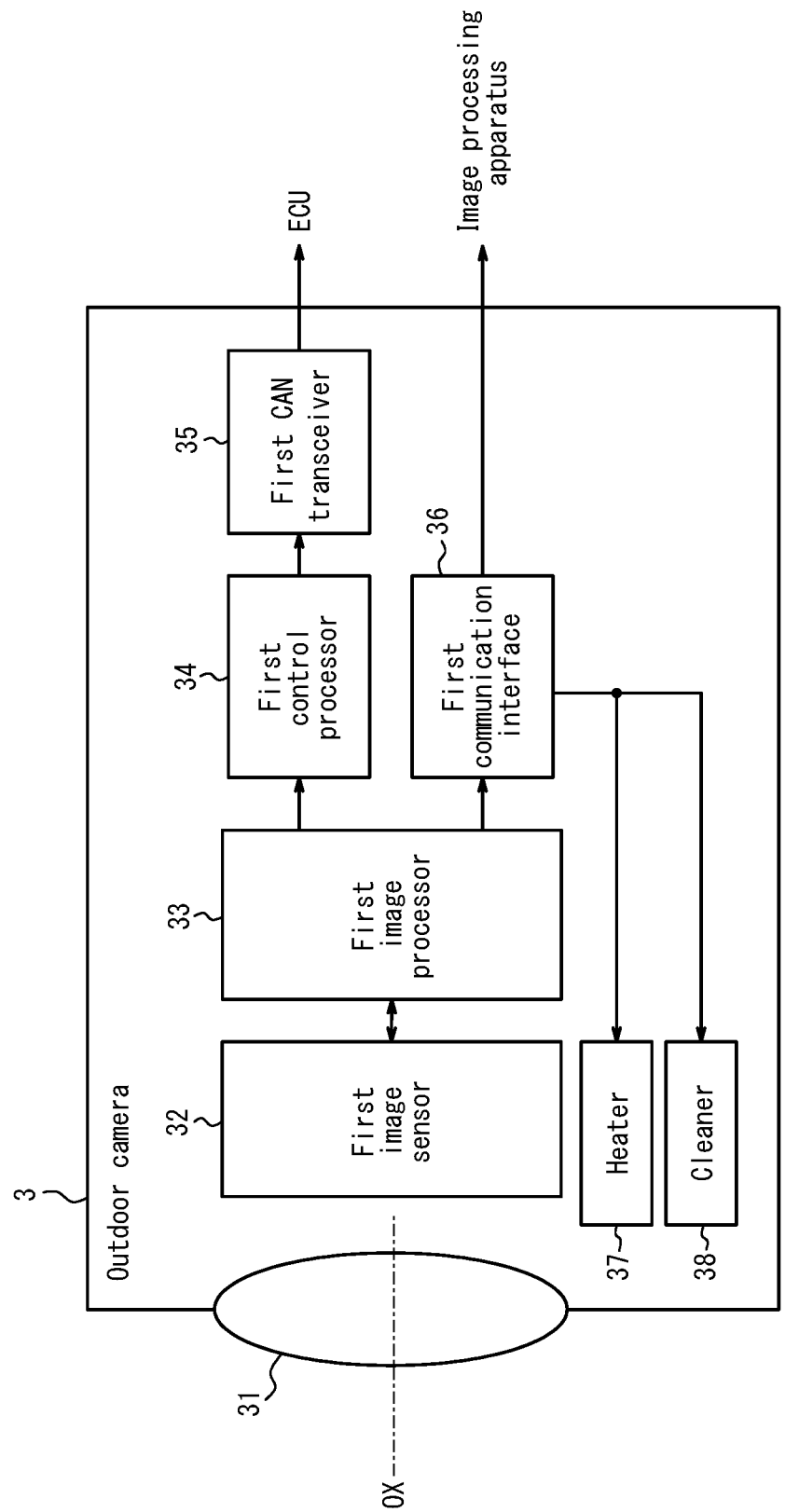
FIG. 3 is a functional block diagram illustrating an outdoor camera illustrated in FIG. 2.

The outdoor camera 3 includes a first optical system 31 (an optical system), a first image sensor 32, a first image processor 33, a first control processor 34, a first CAN (Controller Area Network) transceiver 35, a first communication interface 36, a heater 37, and a cleaner 38, as illustrated in FIG. 3.

The first optical system 31 includes one or more lenses. The first optical system 31 forms an image of light incident from a subject as a subject image on an imaging surface of the first image sensor 32. The lens may be a wide-angle lens. The lens may be a fisheye lens.

The first image sensor 32 (an image sensor) is a CCD (Charge Coupled Device) image sensor, a CMOS (Complementary Metal Oxide Semiconductor) image sensor, or the like. The first image sensor 32 is arranged in a manner perpendicular to an optical axis OX of the lens constituting the first optical system 31. The first image sensor 32 captures a subject image and generates an image. In particular, the first image sensor 32 generates a first image by photoelectrically converting the subject image formed by the first optical system 31.

The first image processor 33 is a processor that is dedicated for image processing and configured to perform various image processing on an image generated by the photoelectric conversion performed by the first image sensor 32, and may include, for example, an ISP (Image Signal Processor). The first image processor 33 is configured to perform control of the first image sensor 32, correction of the first optical system 31, noise reduction, and the like. In a case in which the lens included in the first optical system 31 is a wide-angle lens, the first image processor 33 may correct a distortion occurred in an image caused by the wide-angle lens.

The first control processor 34 is a unit configured to perform various control of the outdoor camera 3 and may include a processor such as an MPU (Micro Processing Unit) configured to perform processing according to a software program.

A first CAN transceiver 35 is an interface for transmitting and receiving information to and from an ECU (Engine Control Unit or Electric Control Unit) configured to control the mobile body 2 via CAN communication. The ECU can control the drive of the mobile body 2 by controlling, for example, a controlled apparatus used in association with the mobile body 2. The controlled apparatus may include, for example, an engine, a motor, a transmission, a car air conditioner, an electric window, a car navigation system, a car audio, a head-up display, or the like, but is not limited thereto.

The first communication interface 36 is an interface configured to transmit and receive information to and from the image processing apparatus 5. A communication method used by the first communication interface 36 to communicate with the image processing apparatus 5 may be a short-range wireless communication standard or a wired communication standard. The short-range wireless communication standard may include, for example, IEEE 802.11, Bluetooth® (Bluetooth is a registered trademark in Japan, other countries, or both), IrDA (InfraredData Association), NFC (Near Field Communication), TrasferJet, ZigBee, or the like.

The heater 37 heats the first optical system 31, based on the control by the image processing apparatus 5. Upon receiving a heating signal from the image processing apparatus 5, the heater 37 may heat the first optical system 31 using a known method.

The cleaner 38 cleans the first optical system 31, based on the control by the image processing apparatus 5. Upon receiving a cleaning signal from the image processing apparatus 5, the cleaner 38 may clean the first optical system 31 using a known method.

The indoor camera 4 is arranged on the interior of the mobile body 2. The indoor camera 4 generates an indoor camera image (a second image) by imaging an outdoor subject via the windshield 21 of the mobile body 2. The indoor camera 4 generates an image such that an imaging range of the image includes at least a portion of an imaging range of the outdoor camera 3. Hereinafter, an image generated by the indoor camera 4 will be referred to as "indoor image". For example, in a case in which the outdoor camera 3 is a rear camera, the windshield 21 may be a rear window.

Figure 4:
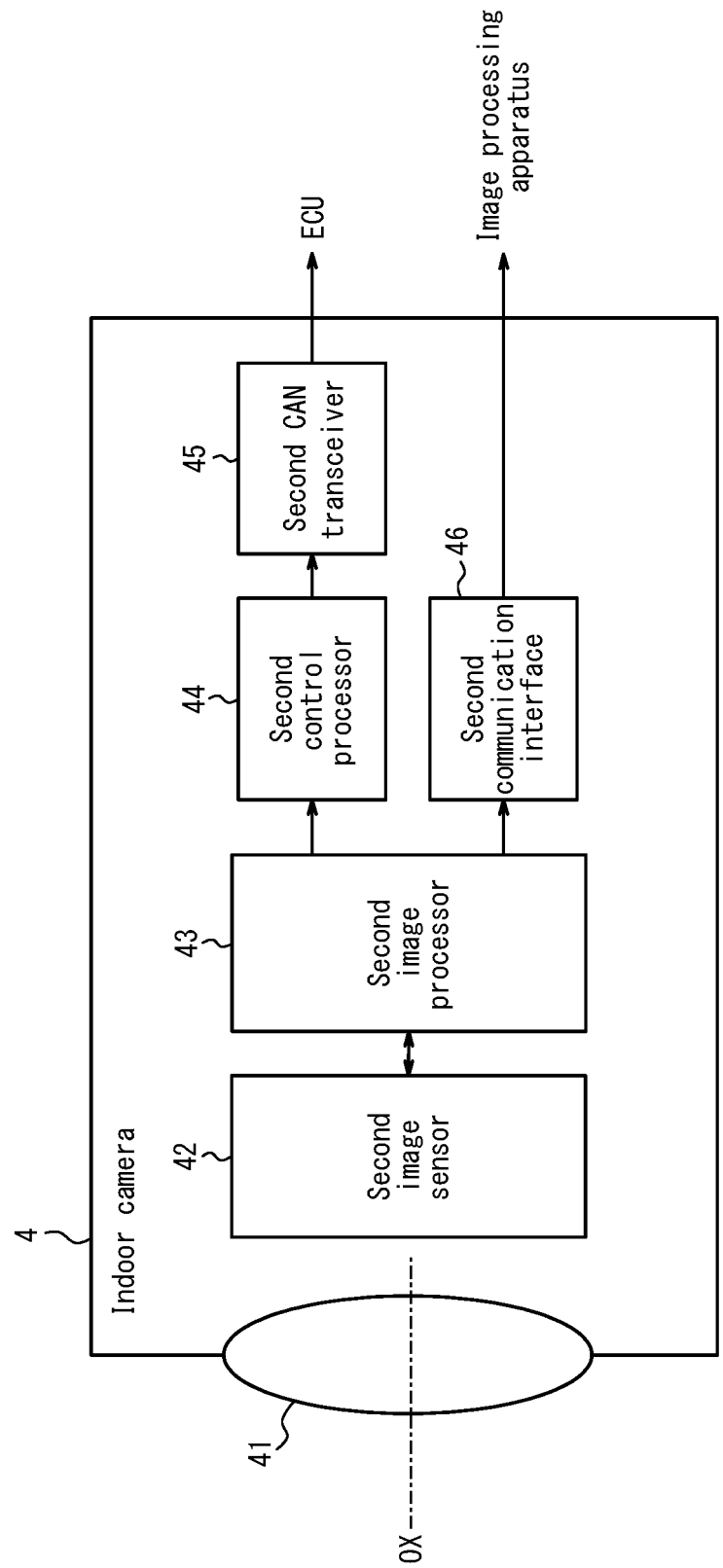
FIG. 4 is a functional block diagram illustrating an indoor camera illustrated in FIG. 2.

The indoor camera 4 is, for example, a cabin mirror camera mounted in the mobile body 2 to image a subject located on the rear side of the mobile body 2, as illustrated in FIG. 1. The indoor camera 4 is not limited to the cabin mirror camera and may be, for example, a camera mounted in the mobile body 2 to image a subject located on the front side, or on the left or right side, of the mobile body 2. The indoor camera 4 includes a second optical system 41, a second image sensor 42 (an image sensor), a second image processor 43, a second control processor 44, a second CAN transceiver 45, and a second communication interface 46, as illustrated in FIG. 4. The second optical system 41, the second image sensor 42, and the second image processor 43 respectively correspond to the first optical system 31, the first image sensor 32, and the first image processor 33, and thus descriptions thereof will be omitted. The second control processor 44, the second CAN transceiver 45, and the second communication interface 46 respectively correspond to the first control processor 34, the first CAN transceiver 35, and the first communication interface 36, and thus descriptions thereof will be omitted.

The image processing apparatus 5 includes a first receiver 51, a second receiver 52, a controller 53, and a transmitter 54, as illustrated in FIG. 2.

The first receiver 51 is configured to receive an outdoor camera image generated by the outdoor camera 3. To communicate with the outdoor camera 3, the first receiver 51 employs the communication method corresponding to the communication method employed by the first communication interface 36.

The second receiver 52 receives an indoor camera image generated by the indoor camera 4. To communicate with the indoor camera 4, the second receiver 52 employs the communication method corresponding to the communication method employed by the second communication interface 46. The second receiver 52 may also function as the first receiver 51 or may be another receiver independent of the first receiver 51.

The controller 53 may be a processor such as, for example, a CPU or the like. The controller 53 may be an integrated circuit such as a SoC (System-on-a-Chip) on which other components are integrated. The controller 53 may be formed by a combination of a plurality of integrated circuits. The controller 53 integrally controls the operation of the image processing apparatus 5 to implement various functions.

The controller 53 determines an abnormality in an outdoor camera image or an indoor camera image, based on a common portion in the imaging ranges of the outdoor camera image and the indoor camera image (hereinafter, simply referred to as "common portion"). Hereinafter, the common portion in the imaging ranges of the outdoor camera image and the indoor camera image will be appropriately referred to simply as "common portion". An abnormality in the outdoor camera image is, for example, an abnormality in an image caused by, for example, a foreign substance attached to the first optical system 31 of the outdoor camera 3 or a failure of the outdoor camera 3. An abnormality in the indoor camera image is, for example, an abnormality in an image caused by, for example, a foreign substance attached to the windshield 21 of the mobile body 2 or a failure of the indoor camera 4. The foreign substance includes, for example, fogging, dirt, and the like. A determination regarding an abnormality in an outdoor camera image or an indoor camera image performed by the controller 53 will be described in detail later.

The transmitter 54 transmits a variety of control signals to the cleaning apparatus 7 and the heating apparatus 6 via a communication network such as CAN communication, based on a determination regarding an abnormality in an outdoor camera image or an indoor camera image performed by the controller 53. The transmitter 54 transmits various images to the outdoor camera display apparatus 8 and the indoor camera display apparatus 9 via the communication network, based on the determination regarding the abnormality in the outdoor camera image or the indoor camera image performed by the controller 53. Various control signals and images transmitted by the transmitter 54 will be described in detail later.

The heating apparatus 6 heats the windshield 21, based on the control by the controller 53. The heating apparatus 6 may heat the windshield 21 using a known method. For example, the heating apparatus 6 may include a hot wire arranged in contact with the windshield 21 and heat the hot wire upon receiving a heating signal instructing heating. Thus, a foreign substance attached to the windshield 21 can be removed.

The cleaning apparatus 7 cleans the windshield 21, based on the control by the controller 53. The cleaning apparatus 7 may clean the windshield 21 using a known method. For example, the cleaning apparatus 7 may accommodate a liquid detergent and inject the liquid detergent to the windshield 21 upon receiving a cleaning signal instructing cleaning. The cleaning apparatus 7 may include a wiper and slide the wiper on the windshield 21 upon receiving the cleaning signal instructing cleaning, or upon ejecting the liquid detergent. Thus, dirt attached to the windshield 21 can be removed.

The outdoor camera display apparatus 8 displays an image transmitted from the image processing apparatus 5. In particular, the outdoor camera display apparatus 8 displays an indoor camera image upon receiving it from the image processing apparatus 5. The outdoor camera display apparatus 8 displays an outdoor camera image upon receiving it from the image processing apparatus 5.

The indoor camera display apparatus 9 displays an image transmitted from the image processing apparatus 5. In particular, the indoor camera display apparatus 9 displays an indoor camera image upon receiving it from the image processing apparatus 5. The indoor camera display apparatus 9 displays an outdoor camera image upon receiving it from the image processing apparatus 5.

Here, a determination regarding there is an abnormality in the outdoor camera image or the indoor camera image made by the controller 53 of the image processing apparatus 5 will be described in detail. The controller 53 determines an abnormality, based on a pixel characteristic value indicating a predetermined characteristic of each pixel of an outdoor camera image and an indoor camera image. The pixel characteristic value is, for example, a luminance. Hereinafter, the controller 53 will be described to be configured to determine an abnormality, based on luminances of an outdoor camera image and an indoor camera image. The pixel characteristic value is not limited to luminance but may be, for example, saturation or brightness.

The controller 53 generates a luminance histogram (a first histogram) indicating a luminance distribution (a distribution of the pixel characteristic value) in the common portion in the outdoor camera image received by the first receiver 51. The controller 53 generates a luminance histogram (a second histogram) indicating a luminance distribution in the common portion in the indoor camera image received by the second receiver 52. A generation time of the indoor camera image used by the controller 53 to generate the second histogram and a generation time of the outdoor camera image used to generate the first histogram fall within a predetermined time period. The predetermined time period is a period in which a difference between an environment of the imaging range of the outdoor camera 3 and an environment of the imaging range of the indoor camera 4 is expected to not have an impact on a determination regarding an abnormality in an image caused by a foreign substance. For example, the outdoor camera image and the indoor camera image may be generated approximately at the same time.

Figure 5:
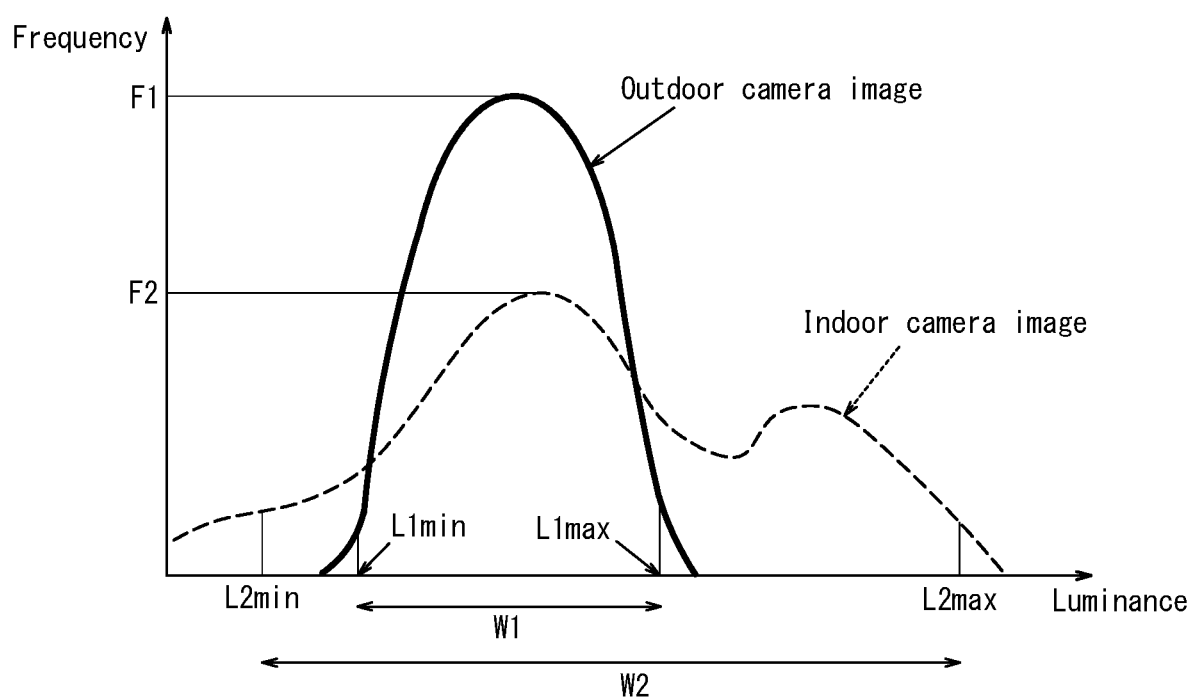
FIG. 5 is a diagram illustrating an example of a luminance histogram of an outdoor camera image and an indoor camera image in a case in which the outdoor camera is fogged.

The controller 53 determines an abnormality, based on an outdoor image characteristic value (a first image characteristic value) and an indoor image characteristic value (a second image characteristic value). The outdoor image characteristic value is a value indicating a luminance characteristic of the common portion in the outdoor image. The outdoor image characteristic value is, for example, an outdoor distribution width W1 (a first distribution width) indicating a width of a luminance distribution of the outdoor camera image, as illustrated in FIG. 5. The indoor image characteristic value is a value indicating a characteristic of a pixel distribution in the common portion in the indoor image. The indoor image characteristic value is, for example, an indoor distribution width W2 (a second distribution width) indicating a width of a luminance distribution of the indoor camera image.

The outdoor distribution width W1 is, of luminances from which a predetermined percentage of pixels having a high luminance and a predetermined percentage of pixels having a low luminance are removed, a value obtained by subtracting a lowest luminance L1min from a highest luminance L1max, as illustrated in FIG. 5 by way of example. The indoor distribution width W2 is, of luminances from which a predetermined percentage of pixels having a high luminance and a predetermined percentage of pixels having a low luminance are removed, a value obtained by subtracting a lowest luminance L2min from a highest luminance L2max. The predetermined percentage is, for example, 10%.

The controller 53 calculates a distribution width ratio R (an image characteristic ratio), based on the outdoor camera image and the indoor camera image. The distribution width ratio R is a value indicating a difference between the luminance distribution of the outdoor camera image and the luminance distribution of the indoor camera image. The distribution width ratio R is, for example, a ratio of the outdoor distribution width W1 to the indoor distribution width W2. In the present embodiment, the distribution width ratio R is described to be the ratio of the outdoor distribution width W1 to the indoor distribution width W2, W1/W2, and will be referred to as a distribution width ratio W1/W2.

In particular, the controller 53 generates the first histogram and the second histogram, based respectively on the outdoor camera image and the indoor camera image. The controller 53 calculates the outdoor distribution width W1 and the indoor distribution width W2, based respectively on the first histogram and the second histogram, respectively. Then, the controller 53 calculates the distribution width ratio W1/W2 by calculating the ratio of the outdoor distribution width W1 to the indoor distribution width W2.

Here, examples of the first histogram and the second histogram will be described with reference to FIG. 5 to FIG. 9.

Figure 6:
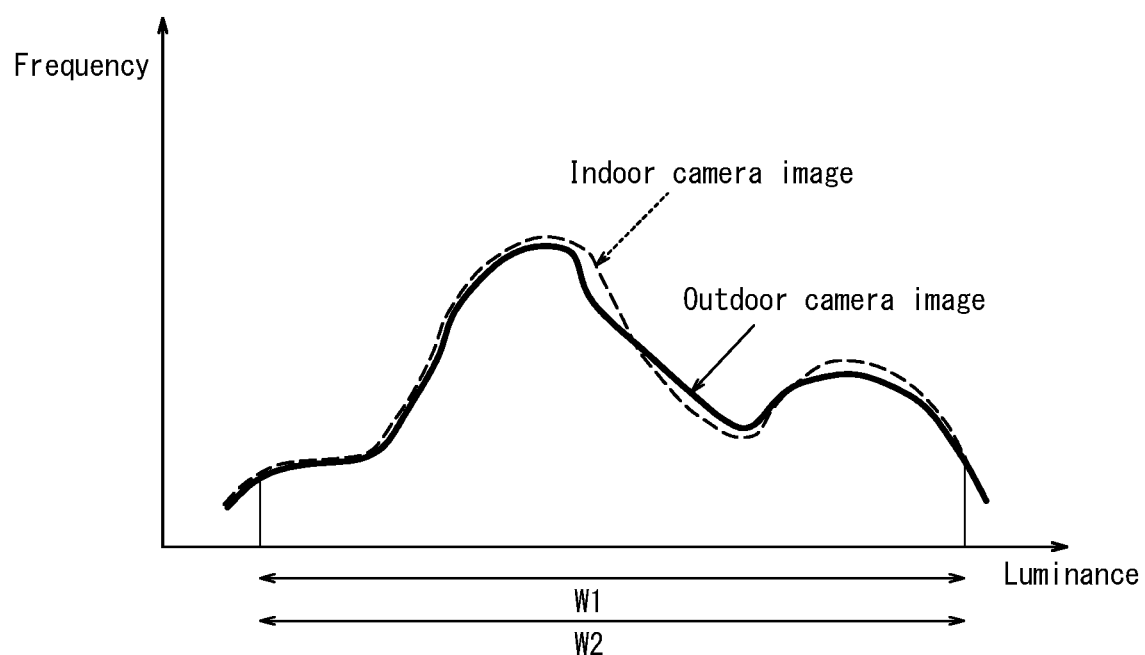
FIG. 6 is a diagram illustrating an example of the luminance histogram of the outdoor camera image and the indoor camera image in a case in which the outdoor camera and a windshield is not fogged.

In a case in which a foreign substance is not attached to the windshield 21, provided that the luminance of the indoor camera image is, for example, an A/D converted value represented by 8 bits, the luminance of the indoor camera image may be distributed over a range from 0 to 255, as illustrated in FIG. 5 and FIG. 6 by way of example. Such a distribution depends on a time zone, weather, a subject, or a surrounding environment such as illumination. At this time, when a foreign substance is not attached to the first optical system 31 of the outdoor camera 3, the luminance distribution of the outdoor camera image is similar to the luminance distribution of the indoor camera image, as illustrated in FIG. 6. Thus, the distribution width ratio W1/W2 is expected to fall within a predetermined range including 1 (e.g., 0.9 to 1.1). On the other hand, in a case in which a foreign substance is attached to the first optical system 31 of the outdoor camera 3, light is hindered from transmitting through the first optical system 31 or scattered by the foreign substance, whereby an among of light that reaches the first image sensor 32 is reduced, or the contrast of a captured image is reduced. Thus, the luminance of the outdoor camera image is distributed in a range narrower than the range of the luminance of the indoor camera image, as illustrated in FIG. 5. Accordingly, the distribution width ratio W1/W2 is smaller than 1 and also than the distribution width ratio W1/W2 of a case in which a foreign substance is not attached to the first optical system 31.

Figure 7:
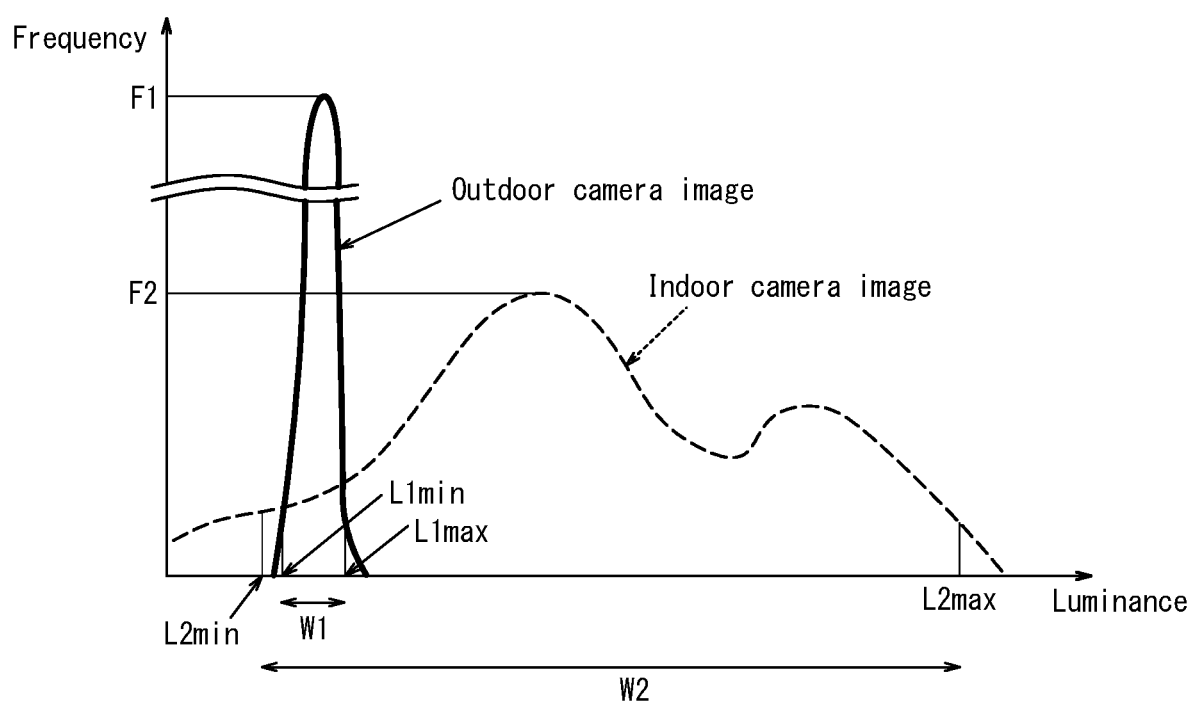
FIG. 7 is a diagram illustrating an example of the luminance histogram of the outdoor camera image and the indoor camera image in a case in which the outdoor camera is faulty.

In a case in which the outdoor camera 3 is faulty, the first image sensor 32 cannot generate an image in a normal manner. In many cases, an image captured by the outdoor camera 3 that is faulty is black in the entire surface and has an approximately zero luminance. As illustrated in FIG. 7, thus, the luminance of the outdoor camera image is distributed in a range narrower than that of the case illustrated in FIG. 5. The outdoor distribution width W1 is smaller than that of the case illustrated in FIG. 5. In this case, when the indoor camera 4 is faulty and, simultaneously, a foreign substance is not attached to the windshield 21, the distribution width ratio W1/W2 is smaller than that of the case illustrated in FIG. 5.

Figure 8:
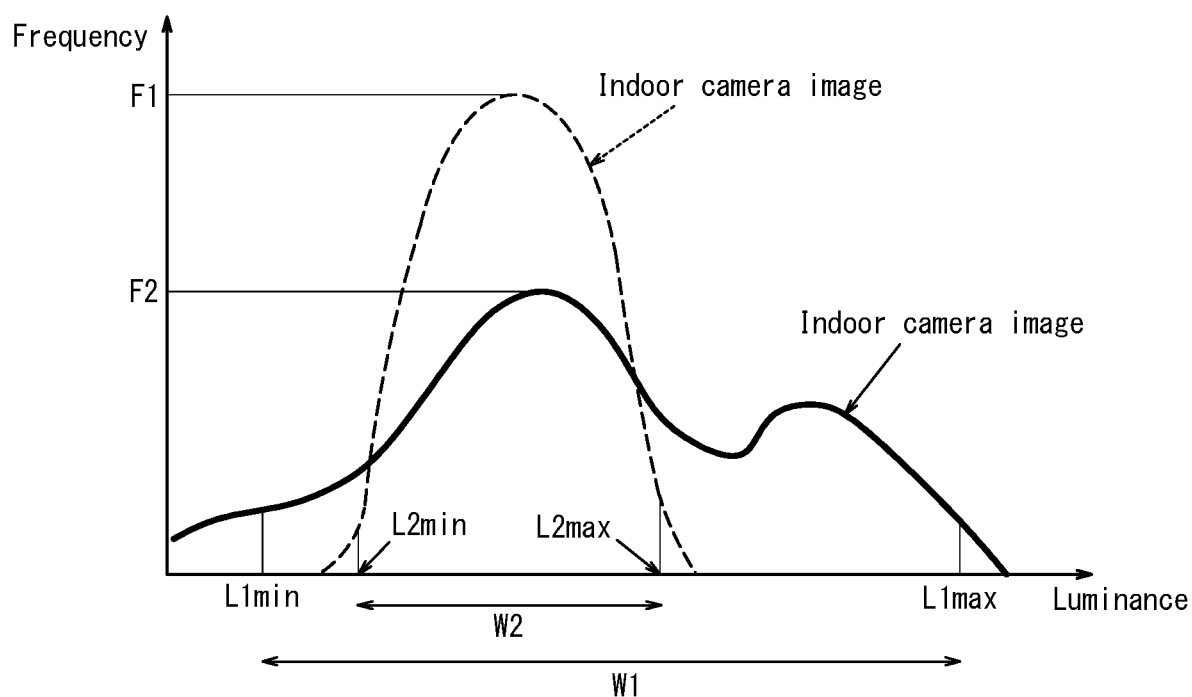
FIG. 8 is a diagram illustrating another example of the luminance histogram of the outdoor camera image and the indoor camera image in a case in which the windshield is fogged.

Although depending on the surrounding environment, in a case in which a foreign substance is not attached to the first optical system 31 and the luminance of the outdoor camera image is, for example, the A/D converted value represented by 8 bits, the luminance of the outdoor camera image is distributed over a range from 0 to 255, as illustrated in FIG. 8. On the other hand, in a case in which a foreign substance is attached to the windshield 21, light is hindered from transmitting through the windshield 21 or scattered by the foreign substance, whereby a quantity of light that reaches the second image sensor 42 of the indoor camera 4 is reduced, or the contrast of a captured image is reduced. Thus, the luminance of the indoor camera image is distributed in a range narrower than the range of the luminance of the outdoor camera image. In this case, the distribution width ratio W1/W2 is larger than 1 and, simultaneously, than the distribution width ratio W1/W2 of the case in which a foreign substance is not attached to the windshield 21.

Figure 9:
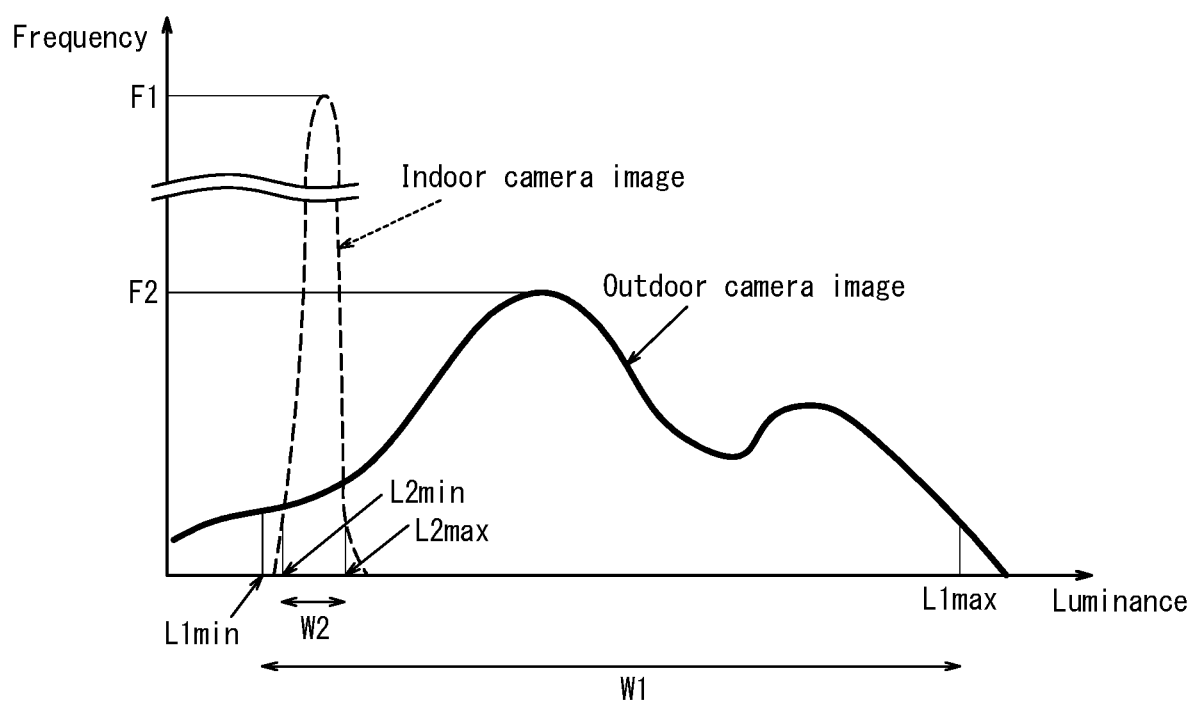
FIG. 9 is a diagram illustrating an example of a luminance histogram of the outdoor camera image and the indoor camera image in a case in which the indoor camera is faulty.

In a case in which the indoor camera 4 is faulty, the second image sensor 42 cannot generate an image in a normal manner. As illustrated in FIG. 9, thus, the luminance of the indoor camera image is distributed in a range narrower than that of the case illustrated in FIG. 8. In this case, the indoor distribution width W2 is smaller than that of the case illustrated in FIG. 8. At this time, in a case in which the outdoor camera 3 is not faulty and, simultaneously, a foreign substance is not attached to the first optical system 31, the distribution width ratio W1/W2 is larger than that of the case illustrated in FIG. 8.

As described above, the distribution width ratio W1/W2 varies depending on an abnormality in the outdoor camera image or the indoor camera image caused by a faulty imaging apparatus or a foreign substance attached to the optical member. By utilizing this variation, the controller 53 determines an abnormality in the outdoor camera image or the indoor camera image, based on the distribution width ratio W1/W2. Then, the controller 53 performs various operations, based on a result of the determination regarding an abnormality in the outdoor camera image or the indoor camera image. Hereinafter, the determination regarding an abnormality and the various operations performed by the controller 53 will be described in detail.

First, an example in which the controller 53 determines an abnormality in the outdoor camera image using an outdoor foreign substance determination value K1 (a first value) and an outdoor camera failure determination value K2 (a second value) will be described. The outdoor foreign substance determination value K1 is a value larger than 0 and smaller than 1. The outdoor foreign substance determination value K1 is an estimated maximum value of the distribution width ratio W1/W2 calculated in a case in which a foreign substance is attached to the first optical system 31, or in a case in which the outdoor camera 3 is faulty, according to an experiment conducted in advance. The outdoor camera failure determination value K2 is a value larger than 0 and smaller than the outdoor foreign substance determination value K1. The outdoor camera failure determination value K2 is an estimated maximum value of the distribution width ratio W1/W2 calculated when the outdoor camera 3 is faulty, according to an experiment conducted in advance.

The controller 53 determines whether the distribution width ratio W1/W2 is equal to or smaller than the outdoor foreign substance determination value K1. In a case in which the controller 53 determines that the distribution width ratio W1/W2 is equal to or smaller than the outdoor foreign substance determination value K1, the controller 53 determines that there is an abnormality in the outdoor camera image caused by a failure of the outdoor camera 3 or a foreign substance attached to the first optical system 31.

When the controller 53 determines that there is an abnormality in the outdoor camera image, the controller 53 performs foreign substance removal control for removing the foreign substance attached to the first optical system 31 of the outdoor camera 3. The foreign substance removal control includes heating and cleaning of the first optical system 31.

In particular, the controller 53 may perform the foreign substance removal control such that the heater 37 of the outdoor camera 3 heats the first optical system 31. For example, when the controller 53 determines that the distribution width ratio W1/W2 is equal to or smaller than the outdoor foreign substance determination value K1, the controller 53 may transmit a heating signal for instructing heating of the first optical system 31 to the outdoor camera 3 from the transmitter 54.

The controller 53 may perform the foreign substance removal control such that the cleaner 38 of the outdoor camera 3 cleans the first optical system 31. For example, when the controller 53 determines that the distribution width ratio W1/W2 is equal to or smaller than the outdoor foreign substance determination value K1, the controller 53 may transmit a cleaning signal for instructing cleaning of the first optical system 31 to the outdoor camera 3 from the transmitter 54.

The controller 53 may determine whether the distribution width ratio W1/W2 is equal to or smaller than the outdoor camera failure determination value K2. When the controller 53 determines that the distribution width ratio W1/W2 is equal to or smaller than the outdoor camera failure determination value K2, the controller 53 may determine that there is an abnormality in the outdoor camera image caused by a failure of the outdoor camera 3, that is, determine that there is an abnormality in the outdoor camera 3.

When the controller 53 determines that there is an abnormality in the outdoor camera 3, the controller 53 may transmit outdoor failure information indicating that the outdoor camera 3 is faulty to the outdoor camera display apparatus 8. The controller 53 may transmit the indoor camera image to the outdoor camera display apparatus 8. The controller 53 may extract an imaging range of the outdoor camera 3 from the indoor camera image. The controller 53 may correct a distortion, a brightness, a contract, and the like such that the indoor camera image has a distortion, a brightness, a contrast, and the like corresponding to those of the image imaged by the outdoor camera 3. The controller 53 may transmit a corrected indoor camera image to the outdoor camera display apparatus 8.

In a case in which the controller 53 determines that the distribution width ratio W1/W2 is not equal to or smaller than the outdoor foreign substance determination value K1 and larger than the outdoor camera failure determination value K2, the controller 53 may determine that there is an abnormality in the outdoor camera image caused by a foreign substance attached to the first optical system 31. In this case, the controller 53 may transmit optical system foreign substance information indicating that a foreign substance is attached to the first optical system 31 to the outdoor camera display apparatus 8. The outdoor camera display apparatus 8 may receive and display the optical system foreign substance information.

Next, an example in which the controller 53 determines an abnormality in the indoor camera image using a window foreign substance determination value K3 (a third value) and an indoor camera failure determination value K4 (a fourth value) will be described. The window foreign substance determination value K3 is a value larger than 1. The window foreign substance determination value K3 is an estimated minimum value of the distribution width ratio W1/W2 calculated when a foreign substance is attached to the windshield 21 or when the indoor camera 4 is faulty, according to an experiment conducted in advance. The indoor camera failure determination value K4 is a value larger than the window foreign substance determination value K3. The indoor camera failure determination value K4 is an estimated minimum value of the distribution width ratio W1/W2 calculated when the indoor camera 4 is faulty, according to an experiment conducted in advance.

The controller 53 determines whether the distribution width ratio W1/W2 is equal to or larger than the window foreign substance determination value K3. When the controller 53 determines that the distribution width ratio W1/W2 is equal to or larger than the window foreign substance determination value K3, the controller 53 determines that there is an abnormality in the indoor camera image caused by a failure of the indoor camera 4 or a foreign substance attached to a member that transmits light to reach the second image sensor 42 of the indoor camera 4. The member that transmits light to reach the second image sensor 42 of the indoor camera 4 is, for example, the windshield 21 or the second optical system 41.

In a case in which the controller 53 determines that there is an abnormality in the indoor camera image, the controller 53 performs the foreign substance removal control for removing a foreign substance attached to the windshield 21. The foreign substance removal control includes heating and cleaning of the windshield 21.

In particular, the controller 53 may perform the foreign substance removal control such that the heating apparatus 6 heats the windshield 21. For example, in a case in which the controller 53 determines that the distribution width ratio W1/W2 is equal to or larger than the window foreign substance determination value K3, the controller 53 may transmit the heating signal for instructing heating of the windshield 21 to the heating apparatus 6.

The controller 53 may perform the foreign substance cleaning control such that the cleaning apparatus 7 cleans the windshield 21. For example, in a case in which the controller 53 determines that the distribution width ratio W1/W2 is equal to or larger than the window foreign substance determination value K3, the controller 53 may transmit the cleaning signal for instructing cleaning of the windshield 21 to the cleaning apparatus 7.

The controller 53 determines whether the distribution width ratio W1/W2 is equal to or larger than the indoor camera failure determination value K4. In a case in which the controller 53 determines that the distribution width ratio W1/W2 is equal to or larger than the indoor camera failure determination value K4, the controller 53 determines that there is an abnormality in the indoor camera image caused by a failure of the indoor camera 4, i.e. determines that there is an abnormality in the indoor camera 4.

In a case in which the controller 53 determines that there is an abnormality in the indoor camera 4, the controller 53 may transmit indoor failure information indicating that the indoor camera 4 is faulty to the indoor camera display apparatus 9. The controller 53 may transmit the outdoor camera image to the indoor camera display apparatus 9. The controller 53 may extract an imaging range of the indoor camera 4 from the outdoor camera image and correct a distortion, a brightness, a contract, and the like such that the outdoor camera image has a distortion, a brightness, a contrast, and the like corresponding to those of the image imaged by the indoor camera 4. The controller 53 may transmit a corrected outdoor camera image to the indoor camera display apparatus 9.

In a case in which the controller 53 determines that the distribution width ratio W1/W2 is equal to or larger than the window foreign substance determination value K3 and smaller than the indoor camera failure determination value K4, the controller 53 may determine that there is an abnormality in the indoor camera image caused by a foreign substance attached to the windshield 21. In this case, the controller 53 may transmit window foreign substance information indicating that a foreign substance is attached to the windshield 21 to the indoor camera display apparatus 9. The indoor camera display apparatus 9 may receive and display the window foreign substance information.

Figure 10A:
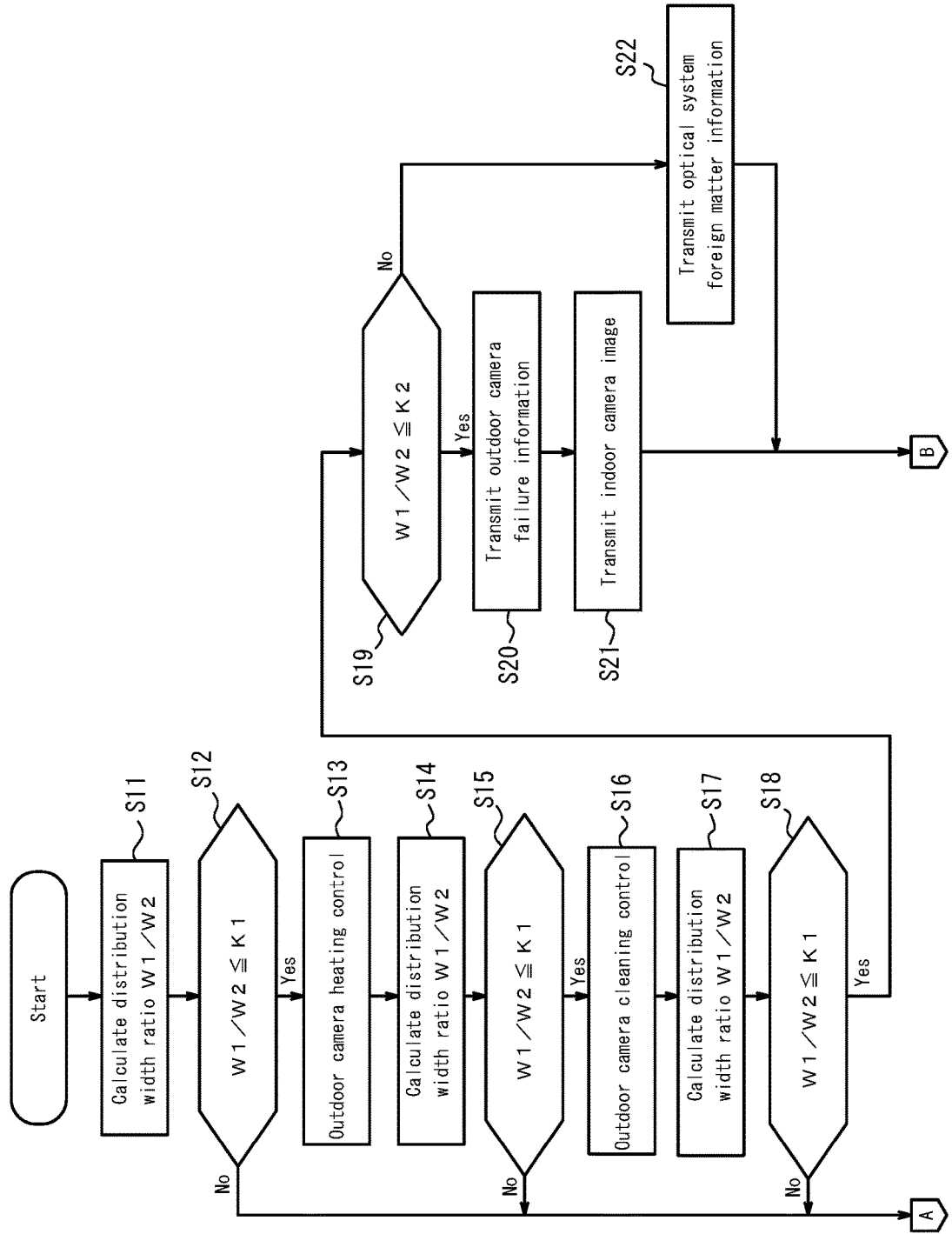
FIG. 10A is a flowchart illustrating a part of a control procedure performed by an image processing apparatus illustrated in FIG. 2.
Figure 10B:
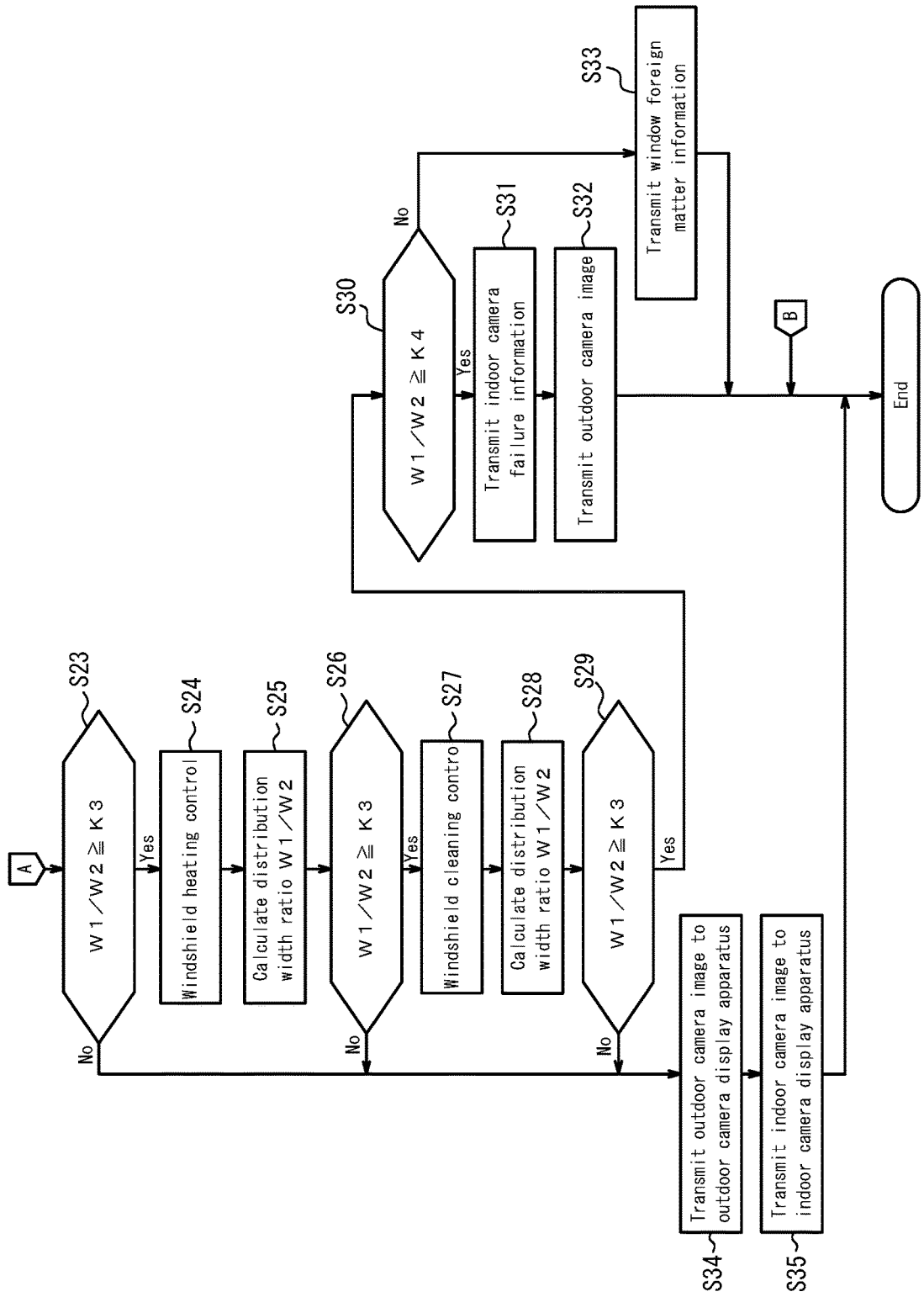
FIG. 10B is a flowchart illustrating a part of the control procedure performed by the image processing apparatus illustrated in FIG. 2.

Next, the image processing method used by the controller 53 will be described with reference to the flowcharts illustrated in FIG. 10A and FIG. 10B. The controller 53 starts the image processing when the outdoor camera image and the indoor image are respectively received by the first receiver 51 and the second receiver 52, and the imaging times of the outdoor camera image and the indoor camera image fall within the predetermined time period.

First, the controller 53 calculates the distribution width ratio W1/W2 (step S11). In particular, the controller 53 generates the first histogram, based on the outdoor camera image received by the first receiver 51. Next, the controller 53 calculates the outdoor distribution width W1, based on the first histogram. The controller 53 generates the second histogram, based on the indoor camera image received by the second receiver 52. Next, the controller 53 calculates the indoor distribution width W2, based on the second histogram. Then, the controller 53 calculates the distribution width ratio W1/W2 as the ratio of the outdoor distribution width W1 to the indoor distribution width W2.

The controller 53 determines whether the distribution width ratio W1/W2 is equal to or smaller than the outdoor foreign substance determination value K1 (step S12).

In a case in which the controller 53 determines in step S12 that the distribution width ratio W1/W2 is equal to or smaller than the outdoor foreign substance determination value K1, the controller 53 determines that there is an abnormality in the outdoor camera image and causes the heater 37 of the outdoor camera 3 to heat the first optical system 31 (step S13).

The controller 53 calculates the distribution width ratio W1/W2 after the heating of the first optical system 31 (step S14).

The controller 53 determines whether the distribution width ratio W1/W2 after the heating of the first optical system 31 calculated in step S14 is equal to or smaller than the outdoor foreign substance determination value K1 (step S15).

In a case in which the controller 53 determines in step S15 that the distribution width ratio W1/W2 is equal to or smaller than the outdoor foreign substance determination value K1, the controller 53 determines that there is an abnormality in the outdoor camera image and causes the cleaner 38 of the outdoor camera 3 to clean the first optical system 31 (step S16).

The controller 53 calculates the distribution width ratio W1/W2 after the cleaning of the first optical system 31 (step S17).

The controller 53 determines whether the distribution width ratio W1/W2 after the cleaning of the first optical system 31 calculated in step S17 is equal to or smaller than the outdoor foreign substance determination value K1 (step S18).

In a case in which the controller 53 determines in step S18 that the distribution width ratio W1/W2 is equal to or smaller than the outdoor foreign substance determination value K1, the controller 53 determines whether the distribution width ratio W1/W2 is equal to or smaller than the outdoor camera failure determination value K2 (step S19).

In a case in which the controller 53 determines in step S19 that the distribution width ratio W1/W2 is equal to or smaller than the outdoor camera failure determination value K2, the controller 53 determines that there is an abnormality in the outdoor camera 3. Then, the controller 53 transmits outdoor camera failure information to the outdoor camera display apparatus 8 from the transmitter 54 (step S20).

The controller 53 transmits the indoor camera image to the outdoor camera display apparatus 8 from the transmitter 54 (step S21). At this time, the controller 53 may correct the indoor camera image and transmit a corrected indoor camera image from the transmitter 54. The controller 53 may transmit the indoor camera image to the indoor camera display apparatus 9 from the transmitter 54.

In a case in which the controller 53 determines in step S19 that the distribution width ratio W1/W2 is larger than the outdoor camera failure determination value K2, the controller 53 transmits the optical system foreign substance information indicating that a foreign substance is attached to the first optical system 31 to the outdoor camera display apparatus 8 from the transmitter 54 (step S22).

In a case in which the controller 53 determines that the distribution width ratio W1/W2 is larger than the outdoor foreign substance determination value K1 in step S12, step S15, or step S18, the controller 53 determines whether the distribution width ratio W1/W2 is equal to or larger than the window foreign substance determination value K3 (step S23).

In a case in which the controller 53 determines that the distribution width ratio W1/W2 is equal to or larger than the window foreign substance determination value K3, the controller 53 determines that there is an abnormality in the indoor camera image and causes the heating apparatus 6 to heat the windshield 21 (step S24).

The controller 53 calculates the distribution width ratio W1/W2 after the heating of the windshield 21 (step S25).

The controller 53 determines whether the distribution width ratio W1/W2 after the heating of the windshield 21 calculated in step S25 is equal to or larger than the window foreign substance determination value K3 (step S26).

In a case in which the controller 53 determines that the distribution width ratio W1/W2 is equal to or larger than the window foreign substance determination value K3, the controller 53 determines that there is an abnormality in the indoor camera image and causes the cleaning apparatus 7 to clean the windshield 21 (step S27).

The controller 53 calculates the distribution width ratio W1/W2 after the cleaning of the windshield 21 (step S28).

The controller 53 determines whether the distribution width ratio W1/W2 after the cleaning of the windshield 21 calculated in step S28 is equal to or larger than the window foreign substance determination value K3 (step S29).

In a case in which the controller 53 determines that the distribution width ratio W1/W2 is equal to or larger than the window foreign substance determination value K3, the controller 53 determines whether the distribution width ratio W1/W2 is equal to or larger than the indoor camera failure determination value K4 (step S30).

In a case in which the controller 53 determines in step S30 that the distribution width ratio W1/W2 is equal to or larger than the indoor camera failure determination value K4, the controller 53 determines that there is an abnormality in the indoor camera 4. Then, the controller 53 transmits indoor camera failure information to the indoor camera display apparatus 9 from the transmitter 54 (step S31).

The controller 53 transmits the outdoor camera image to the indoor camera display apparatus 9 from the transmitter 54 (step S32). At this time, the controller 53 may correct the outdoor camera image and transmit a corrected outdoor camera image from the transmitter 54. The controller 53 may transmit the outdoor camera image to the outdoor camera display apparatus 8 from the transmitter 54.

In a case in which the controller 53 determines in step S30 that the distribution width ratio W1/W2 is smaller than the indoor camera failure determination value K4, the controller 53 transmits the window foreign substance information to the indoor camera display apparatus 9 from the transmitter 54 (step S33).

According to the first embodiment, as described above, the image processing apparatus 5 includes the first receiver 51 configured to receive the outdoor camera image and the second receiver 52 configured to receive the indoor camera image. The image processing apparatus 5 further includes the controller 53 configured to determine an abnormality in the indoor camera image or the outdoor camera image, based on the common portion in the imaging ranges of the outdoor camera image and the indoor camera image. An image generated by a camera greatly varies depending on an influence by the surrounding environment. Thus, it is difficult to determine based on one image whether an abnormality in an image is caused by a failure of a camera or a foreign substance attached to an optical member. For example, in a case in which an image generated by one camera is entirely represented by an almost black hue, it is difficult to determine whether it is because that the subject is in color similar to black or that the optical member is fogged. For example, in a case in which an image generated by one camera is entirely represented by an almost black hue, it is difficult to determine whether it is because that the subject is in color similar to black or that the camera is faulty. On the other hand, the common portion in the imaging ranges of the outdoor camera image and the indoor camera image according to the first embodiment share the same surrounding environment. Thus, the image processing apparatus 5 can accurately determine an abnormality by comparing the indoor camera image and the outdoor camera image.

According to the first embodiment, the outdoor camera image is generated by imaging a subject without passing through the windshield 21. The indoor camera image is generated by imaging the subject via the windshield 21. Thus, in a case in which dirt is attached to the windshield 21 or the windshield 21 is fogged, the common portion in the indoor camera image shows an image different from an image of the common portion in the outdoor camera image generated by imaging without passing through the windshield 21. Thus, the image processing apparatus 5 according to the first embodiment can determine an abnormality caused by a foreign substance attached to the windshield 21, by comparing the indoor camera image and the outdoor camera image that are generated in the same surrounding environment.

According to the first embodiment, in a case in which the image processing apparatus 5 determines that the distribution width ratio W1/W2 is equal to or smaller than the outdoor foreign substance determination value K1, the image processing apparatus 5 determines that there is an abnormality in the outdoor camera image and performs the foreign substance removal control. Thus, the abnormality in the outdoor camera image can be eliminated.

According to the first embodiment, in a case in which the image processing apparatus 5 determines that the distribution width ratio W1/W2 after the foreign substance removal control is performed is equal to or smaller than the outdoor foreign substance determination value K1 and, simultaneously, equal to or smaller than the outdoor camera failure determination value K2, the image processing apparatus 5 determines that there is an abnormality in the outdoor camera 3. Thus, the image processing apparatus 5 can transmit the outdoor failure information indicating that the outdoor camera image is faulty to the outdoor camera display apparatus 8. The outdoor camera display apparatus 8 can display the outdoor failure information. Accordingly, the driver of the mobile body 2 recognizes that the outdoor camera 3 is faulty. This can encourage the driver to drive safe by carefully checking on an outside situation of the mobile body 2 using the indoor camera image generated by the indoor camera 4 or fixing the outdoor camera 3 at an early stage.

According to the first embodiment, in a case in which the image processing apparatus 5 determines that the distribution width ratio W1/W2 is equal to or larger than the window foreign substance determination value K3, the image processing apparatus 5 determines that there is an abnormality in the indoor camera image and performs the foreign substance removal control for removing a foreign substance attached to the second optical system 41 or the windshield 21. In this way, the image processing apparatus 5 can eliminate the abnormality in the indoor camera image.

According to the first embodiment, in a case in which the image processing apparatus 5 determines that the distribution width ratio W1/W2 after the foreign substance removal control is performed is equal to or larger than the window foreign substance determination value K3, and then that the distribution width ratio W1/W2 is equal to or larger than the indoor camera failure determination value K4, the image processing apparatus 5 determines that there is an abnormality in the indoor camera 4. Thus, the image processing apparatus 5 can transmit the indoor failure information indicating that the indoor camera image is faulty to the indoor camera display apparatus 9. The indoor camera display apparatus 9 can display the indoor failure information. Accordingly, the driver of the mobile body 2 recognizes that the indoor camera 4 is faulty. This can encourage the driver to drive safe by carefully checking on an outside situation of the mobile body 2 using the outdoor camera image, rather than the indoor camera image, or fixing the indoor camera 4 at an early stage.

According to the first embodiment, in a case in which the image processing apparatus 5 determines that there is an abnormality in the outdoor camera 3, the image processing apparatus 5 transmits the image based on the indoor camera image to the outdoor camera display apparatus 8. Thus, although the driver of the mobile body 2 cannot refer to the outdoor camera image, the driver can recognize the outside situation using the indoor camera image. In a case in which the image processing apparatus 5 determines that there is an abnormality in the indoor camera 4, the image processing apparatus 5 transmits the image based on the outdoor camera image to the indoor camera display apparatus 9. Thus, although the driver of the mobile body 2 cannot refer to the indoor camera image, the driver can recognize the outside situation using the outdoor camera image.

Next, a second embodiment of the present disclosure will be described.

In the second embodiment, configurations different from the configurations of the first embodiment will be described. Configurations whose descriptions are omitted in the second embodiment are the same as the configurations of the first embodiment.

In the first embodiment, the outdoor image characteristic value is the outdoor distribution width W1 indicating the width of the luminance distribution of the outdoor image. Also, the indoor image characteristic value is the indoor distribution width W2 indicating the width of the luminance distribution of the indoor image. According to the second embodiment, on the other hand, the outdoor image characteristic value is a maximum frequency F1 (a first maximum frequency) of the luminance of the outdoor camera image, as illustrated in FIG. 5. Also, the indoor image characteristic value is a maximum frequency F2 (a second maximum frequency) of the luminance of the indoor camera image. The image characteristic ratio is a maximum frequency ratio F2/F1, which is a ratio of the maximum frequency F2 to the maximum frequency F1.

When a foreign substance is attached to the outdoor camera 3, the quantity of light that reaches the outdoor camera 3 is reduced by the foreign substance. Thus, in the luminance distribution of the outdoor camera image, a frequency corresponding to a low luminance increases. On the other hand, when a foreign substance is not attached to the indoor camera 4, an increase in the number of frequencies corresponding to a low luminance due to a reduction in the quantity of light caused by the foreign substance is small. In this case, the maximum frequency ratio F2/F1 is smaller than that of a case in which a foreign substance is not attached to the outdoor camera 3. Similarly, in a case in which a foreign substance is attached to the windshield 21 and, simultaneously, a foreign substance is not attached to in the outdoor camera 3, the maximum frequency ratio F2/F1 is larger than that of a case in which a foreign substance is not attached to the windshield 21.

Thus, the controller 53 may determine an abnormality in the outdoor camera image, based on the maximum frequency ration F2/F1 using the outdoor foreign substance determination value K1 and the outdoor camera failure determination value K2. The outdoor foreign substance determination value K1 and the outdoor camera failure determination value K2 of the second embodiment may be respectively different from the outdoor foreign substance determination value K1 and the outdoor camera failure determination value K2 of the first embodiment. The controller 53 may determine an abnormality in the indoor camera image, based on the maximum frequency ratio F2/F1 using the window foreign substance determination value K3 and the indoor camera failure determination value K4. The window foreign substance determination value K3 and the indoor camera failure determination value K4 of the second embodiment may be respectively different from the window foreign substance determination value K3 and the indoor camera failure determination value K4 of the first embodiment.

According to the second embodiment, as described above, the image processing apparatus 5 determines an abnormality in the indoor camera image or the outdoor camera image, based on the common portion in the imaging ranges of the outdoor camera image and the indoor camera image. Thus, an abnormality in the indoor camera image or the outdoor camera image can be accurately determined, in a manner similar to the first embodiment.

According to the second embodiment, further, the image processing apparatus 5 determines an abnormality in the outdoor camera image or indoor camera image, based on the maximum frequency ratio F2/F1. When the maximum frequency F1 is larger than the maximum frequency F2, it may be estimated that there is an abnormality in the outdoor camera image caused by a failure of the outdoor camera 3 or a foreign substance attached to the outdoor camera 3. When the maximum frequency F1 is smaller than the maximum frequency F2, it may be estimated that there is an abnormality in the outdoor camera image caused by a failure of the indoor camera 4 or a foreign substance attached to the windshield 21. Thus, the image processing apparatus 5 can accurately determine an abnormality in the indoor camera image or the outdoor camera image.

Next, a third embodiment of the present disclosure will be described with reference to the drawings.

In the third embodiment, configurations different from the configurations of the first embodiment will be described. Configurations whose descriptions are omitted in the third embodiment are the same as the configurations of the first embodiment.

In the third embodiment, the outdoor image characteristic value is an edge width WE1 (a first edge width) of a boundary between subjects included in an outdoor camera image. The indoor image characteristic value is an edge width WE2 (a second edge width) of a boundary between the subjects included in an indoor camera image. The image characteristic ratio is an edge width ratio W2/W1, which is a ratio of the edge width WE2 of the indoor camera image to the edge width WE1 of the outdoor camera image.

The edge width WE1 and the edge width WE2 are values indicating a low level of contrast in the outdoor camera image and the indoor camera image, respectively. Each the edge width WE1 and the edge width WE2 is a width of a region in which luminance varies within an edge region. The edge region is a region including an edge extracted from one of the outdoor camera image and the indoor camera image using a known method, and a region corresponding to the edge region in the other one of the images.

In particular, in a case in which the edge region is extracted from the outdoor camera image, the edge region of the outdoor camera image is the extracted edge region. In this case, the edge region of the indoor camera image is a region corresponding to the edge region of the outdoor camera image. In a case in which the edge region is extracted from the indoor camera image, the edge region of the outdoor camera image is the extracted edge region. In this case, the edge region of the indoor camera image is a region corresponding to the edge region of the outdoor camera image.

Figure 11:
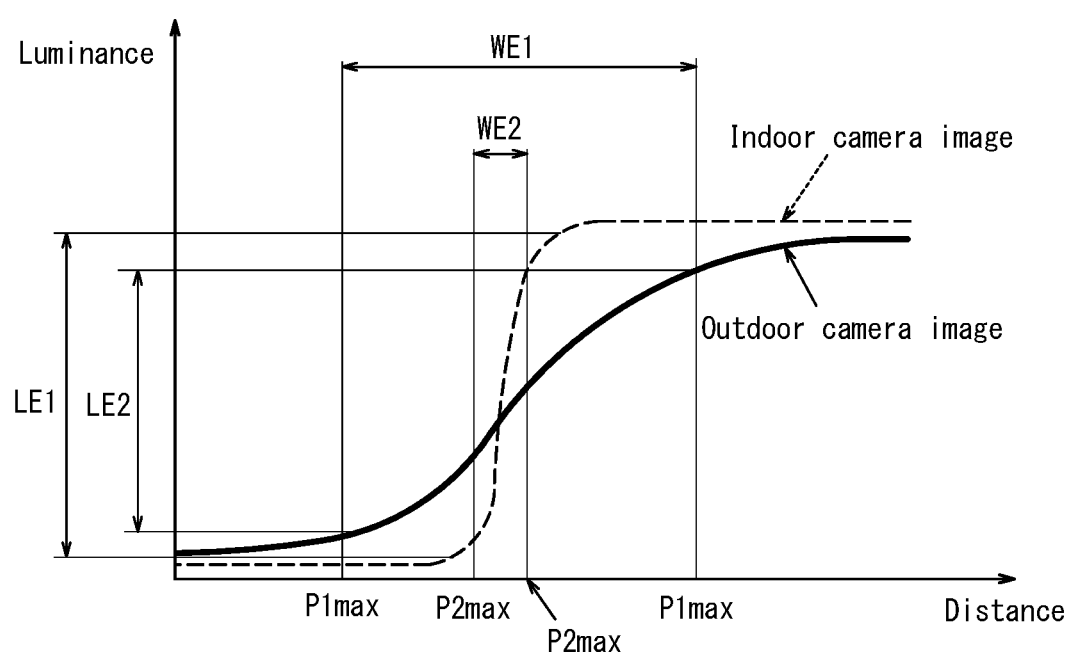
FIG. 11 is a diagram illustrating luminances of pixels of the outdoor camera image and the indoor camera image located at certain distances in a predetermined direction from any reference point in a direction intersecting an edge.

FIG. 11 is a diagram indicating luminances of pixels according to their distances from a reference point in a direction intersecting the edge. Referring to FIG. 11, a region in which the pixel characteristic value varies is a region in which the luminance falls between a highest luminance (a highest characteristic value) and a lowest luminance (a lowest characteristic value). Thus, the edge width WE1 is a difference between a position P1max corresponding to a highest luminance in the edge region of the outdoor camera image and a position P1min corresponding to a lowest luminance. The highest luminance is, for example, a luminance obtained by multiplying a maximum luminance in the edge region by a predetermined coefficient smaller than 1 (e.g., 0.8). The lowest luminance is a luminance obtained by multiplying a minimum luminance in the edge region by a predetermined coefficient larger than 1 (e.g., 1.2). For example, the edge width WE2 is a difference between a position P2max corresponding to the highest luminance in the region corresponding to the edge region and a position P2min corresponding to the lowest luminance.

When a foreign substance is attached to the outdoor camera 3, light having reached the outdoor camera 3 is scattered and/or absorbed, whereby the luminance contrast becomes lower than that of a case in which a foreign substance is not attached to the outdoor camera 3. Thus, when a foreign substance is attached to the outdoor camera 3, the edge width WE1 of the outdoor camera image is larger than that of a case in which a foreign substance is not attached. On the other hand, when a foreign substance is not attached to the windshield 21, a reduction in contrast of the indoor camera image accompanying a reduction in the quantity of light caused by a foreign substance is small, and thus the edge width WE2 of the indoor camera image does not increase. Thus, when a foreign substance is attached to the outdoor camera 3 and, simultaneously, a foreign substance is not attached to the windshield 21, the edge width ratio WE2/WE1 is smaller than that of a case in which a foreign substance is not attached to the outdoor camera 3. Similarly, when a foreign substance is attached to the windshield 21 and, simultaneously, a foreign substance is not attached to the outdoor camera 3, the edge width ratio WE2/WE1 is larger than that of a case in which a foreign substance is not attached to the windshield 21.

Accordingly, the controller 53 extracts the edge from the outdoor camera image and the indoor camera image using a known method. When the edge region is extracted from one of the outdoor camera image and the indoor camera image, the controller 53 calculates the edge width WE1 and the edge width W2, based on the edge region. In particular, when the edge region is extracted from the outdoor camera image, the controller 53 calculates the edge width WE1, based on the edge region. The controller 53 calculates the edge width WE2, based on a region corresponding to the edge region of the indoor camera image. Then, the controller 53 calculates the edge width ratio WE2/WE1.

Further, the controller 53 may determine an abnormality in the outdoor camera image, based on the edge width ratio WE2/WE1, using the outdoor foreign substance determination value K1 and the outdoor camera failure determination value K2. The outdoor foreign substance determination value K1 and the outdoor camera failure determination value K2 of the third embodiment may be values respectively different from the outdoor foreign substance determination value K1 and the outdoor camera failure determination value K2 of the first embodiment. The controller 53 may determine an abnormality in the indoor camera image, based on the edge width ratio WE2/WE1, using the window foreign substance determination value K3 and the indoor camera failure determination value K4. The window foreign substance determination value K3 and the indoor camera failure determination value K4 of the third embodiment may be values respectively different from the window foreign substance determination value K3 and the indoor camera failure determination value K4 of the first embodiment.

According to the third embodiment, as described above, the image processing apparatus 5 determines an abnormality in the outdoor camera image or the indoor camera image, based on the edge width ratio WE2/WE1. When a foreign substance such as dirt or fogging is attached to the optical member, contrast of the image is reduced. Thus, the image processing apparatus 5 can determine an abnormality in the outdoor camera image or the indoor camera image using the edge widths WE1 and WE2 that vary in accordance with contrast.

Next, a fourth embodiment of the present disclosure will be described with reference to the drawings.

In the fourth embodiment, configurations different from the configurations of the third embodiment will be described. Configurations whose descriptions are omitted in the fourth embodiment are the same as the configurations of the third embodiment.

In the fourth embodiment, the outdoor image characteristic value is an edge level LE1 (a first edge level) of the outdoor camera image, as illustrated in FIG. 1. The indoor image characteristic value is an edge level LE2 (a second edge level) of the indoor camera image. An image characteristic ratio is an edge level ratio LE1/LE2, which is a ratio of the edge level LE1 of the indoor camera image to a ratio of the edge level LE2 of the outdoor camera image.

Each the edge level LE1 and the edge level LE2 is a value indicating a low contrast level of the outdoor camera image. For example, the edge level LE1 may be a difference between a maximum luminance (a maximum pixel characteristic value) and a minimum luminance (a minimum pixel characteristic value) in a region in which a luminance change ratio in the edge region of the outdoor camera image is equal to or larger than a predetermined value. The edge level LE2 may be a difference between a maximum luminance and a minimum luminance in a region in which a luminance change ratio in the edge region of the indoor camera image is equal to or larger than a predetermined value. The luminance change ratio is, for example, a difference between a luminance of each pixel and a luminance of a pixel adjacent to the pixel in a direction intersecting the edge. The edge region of the fourth embodiment is the same as the edge region of the third embodiment.

In a case in which a foreign substance is attached to the outdoor camera 3, light having reached the outdoor camera 3 is scattered and/or absorbed, whereby the luminance contrast is lower than that of a case in which a foreign substance is not attached to the outdoor camera 3. Thus, when a foreign substance is attached to the outdoor camera 3, the edge level LE1 of the outdoor camera image is smaller than that of a case in which a foreign substance is not attached. On the other hand, when a foreign substance is not attached to the windshield 21, a reduction in the contrast of the indoor camera image accompanying the scattering of light due to the foreign substance is small, whereby the edge level LE1 of the indoor camera image is not reduced. Accordingly, the edge level ratio LE1/LE2 is smaller than that of a case in which a foreign substance is not attached to the outdoor camera 3. Similarly, when a foreign substance is attached to the windshield 21 and, simultaneously, a foreign substance is not attached to the outdoor camera 3, the edge level ratio LE2/LE1 is larger than that of a case in which a foreign substance is not attached to the windshield 21.

Accordingly, the controller 53 may determine an abnormality in the outdoor camera image, based on the edge level ratio LE1/LE2, using the outdoor foreign substance determination value K1 and the outdoor camera failure determination value K2. The outdoor foreign substance determination value K1 and the outdoor camera failure determination value K2 of the fourth embodiment may be values respectively different from the outdoor foreign substance determination value K1 and the outdoor camera failure determination value K2 of the third embodiment. The controller 53 may determine an abnormality in the indoor camera image, based on the edge level ratio LE1/LE2, using the window foreign substance determination value K3 and the indoor camera failure determination value K4. The window foreign substance determination value K3 and the indoor camera failure determination value K4 of the fourth embodiment may be values respectively different from the window foreign substance determination value K3 and the indoor camera failure determination value K4 of the third embodiment.

According to the fourth embodiment, as described above, the image processing apparatus 5 determines an abnormality in the outdoor camera image or the indoor camera image, based on the edge level ratio LE1/LE2. When a foreign substance such as dirt or fogging is attached to the optical member, the contrast of the image generated by imaging light transmitting through the optical member is reduced. Accordingly, the image processing apparatus 5 can determine an abnormality in the outdoor camera image or the indoor camera image using the edge level ratios LE1 and LE2 that vary in accordance with contrast.

Next, a fifth embodiment of the present disclosure will be described with reference to the drawings.

In the fifth embodiment, configurations different from the configurations of the first embodiment will be described. Configurations whose descriptions are omitted in the fifth embodiment are the same as the configurations of the first embodiment.

In the first embodiment, the controller 53 determines an abnormality in the outdoor camera image or the indoor camera image, based on the outdoor image characteristic value and the indoor image characteristic value. In the fifth embodiment, on the other hand, the controller 53 determines an abnormality in the outdoor camera image or the indoor camera image, based on an outdoor binarized image obtained by binarizing the common portion in the outdoor camera image and an indoor binarized image obtained by binarizing the common portion in the indoor camera image. In particular, the controller 53 determines whether each pixel of the outdoor binarized image and a corresponding pixel of the indoor binarized image respectively match each other. The controller 53 calculates a matching rate, which is a rate of the number of matched pixels to a total number of pixels. When the matching rate is equal to or smaller than a threshold, the controller 53 may determine that there is an abnormality in one of the outdoor binarized image and the indoor binarized image.

According to the fifth embodiment, as described above, the image processing apparatus 5 determines an abnormality, based on a common portion in imaging ranges of the outdoor binarized image and the indoor binarized image. When there is not an abnormality in any of the outdoor camera image and the indoor camera image, most pixels in the outdoor binarized image and the indoor binarized image match one another. However, when a foreign substance such as dirt or fogging is attached to the optical member, the luminance of the image is reduced. That is, the matching rate is reduced by the foreign substance attached to the optical member. Thus, the image processing apparatus 5 can determine an abnormality, based on the common portion in the imaging ranges of the outdoor binarized image and the indoor binarized image.

The term "mobile body" as used herein encompasses automobiles and industrial vehicles, but is not limited thereto and may also include rail vehicles, domestic vehicles, and fixed-wing aircraft that travel on a runway. Automobiles include cars, trucks, buses, motorcycles, and trolley buses, but are not limited thereto and may also include other automobiles that travel on the road. Industrial vehicles include agricultural vehicles and construction vehicles. Industrial vehicles include, but are not limited to, forklifts and golf carts. Industrial vehicles for agricultural purpose include, but are not limited to, tractors, tillers, transplanters, binders, combine harvesters, and lawn mowers. Industrial vehicles for construction purposes include, but are not limited to, bulldozers, scrapers, excavators, crane trucks, dump trucks, and load rollers. Vehicles may include human-power vehicles traveling on human power. Classification of the vehicles is not limited to the above. For example, vehicles may include industrial vehicles authorized to travel on the road, and a plurality of categories may include the same type of vehicle.

Although the above embodiments have been described as typical examples, it should be appreciated that those who are skilled in the art may perform variations or alterations in a multiple manner within the gist and scope of the present disclosure. Accordingly, the present disclosure should not be construed as being limited to the above embodiments or examples and can be varied or altered in various manners without departing from the scope of claims. For example, a plurality of functional blocks described in an embodiment or example may be combined, or one functional block may be subdivided.

Although in the above embodiments the controller 53 determines that there is an abnormality in the outdoor camera 3 when the controller 53 determines that the distribution width ratio W1/W2 is equal to or smaller than the outdoor camera failure determination value K2, this is not restrictive. For example, the controller 53 may determine that there is an abnormality in the outdoor camera 3 when the distribution width ratio W1/W2 is equal to or larger than the outdoor camera failure determination value K2 and, simultaneously, the outdoor distribution width W1 is equal to or smaller than a first failure value K5.

Although in the above embodiments the controller 53 determines that there is an abnormality in the indoor camera 4 when the controller 53 determines that the distribution width ratio W1/W2 is equal to or larger than the indoor camera failure determination value K4, this is not restrictive. For example, the controller 53 may determine that there is an abnormality in the indoor camera 4 when the distribution width ratio W1/W2 is equal to or larger than the indoor camera failure determination value K4 and, simultaneously, the indoor distribution width W2 is equal to or smaller than a second failure value K6.

When the outdoor camera 3 is faulty, it is expected that the luminance distribution range of the outdoor camera image is low, as illustrated in FIG. 7, irrespective of a time zone, weather, a subject, or a surrounding environment such as illumination. Thus, a failure of the outdoor camera 3 can be more accurately determined based on the outdoor distribution width W1. Similarly, a failure of the indoor camera 4 can be more accurately determined based on the indoor distribution width W2.

Although in the above embodiments the first imaging apparatus is the outdoor camera 3 and the second imaging apparatus is the indoor camera 4, this is not restrictive. For example, both the first imaging device and the second imaging device may function as the outdoor camera 3. In this case, in a case in which the controller 53 determines that the distribution width ratio W1/W2 is equal to or larger than the window foreign substance determination value K3, the controller 53 determines that there is an abnormality in an image (a second image) captured by the second imaging apparatus caused by a foreign substance attached to the second optical system 41, rather than to the windshield 21. When the controller 53 determines that there is an abnormality in the second imaging apparatus, the controller 53 may perform the foreign substance removal control for removing a foreign substance from the second optical system 41, rather than from the windshield 21.

Although in the above embodiments the outdoor camera 3 includes the heater 37 and the cleaner 38, this is not restrictive. For example, the outdoor camera 3 can omit the heater 37 and the cleaner 38, and a heater and a cleaner independent of the outdoor camera 3 may be provided in the vicinity of the outdoor camera 3. In this case, the controller 53 may control the heater and the cleaner by transmitting the heating signal and the cleaning signal respectively to the heater and the cleaner, rather than to the outdoor camera 3. The heater may heat the first optical system 31 upon receiving the heating signal. The cleaner may clean the first optical system 31 upon receiving the cleaning signal.

Although in the above embodiments the controller 53 heats and cleans the first optical system 31 and the windshield 21, this is not restrictive. For example, the controller 53 may heat the first optical system 31 and the windshield 21 and does not need to clean them. For example, the controller 53 may clean the first optical system 31 and the windshield 21 and does not need to clean them. Although the controller 53 performs the foreign substance removal control for heating or cleaning, this is not restrictive. The controller 53 may remove a foreign substance attached to the first optical system 31 and the windshield 21 using any appropriate methods.

In the above embodiments, the controller 53 determines an abnormality in the outdoor camera image using the outdoor foreign substance determination value K1 and the outdoor camera failure determination value K2, and then determines an abnormality in the indoor camera image using the window foreign substance determination value K3 and the indoor camera failure determination value K4. However, a method for determining an abnormality in the indoor camera image is not limited thereto. For example, the controller 53 may determine an abnormality in the indoor camera image using the window foreign substance determination value K3 and the indoor camera failure determination value K4, and then determine an abnormality in the outdoor camera image using the outdoor foreign substance determination value K1 and the outdoor camera failure determination value K2.

REFERENCE SIGNS LIST 1 imaging system
2 mobile body
3 outdoor camera (first imaging apparatus)
4 indoor camera (second imaging apparatus)
5 image processing apparatus
6 heating apparatus
7 cleaning apparatus
8 outdoor camera display apparatus (first display apparatus)
9 indoor camera display apparatus (second display apparatus)
31 first optical system
32 first image sensor
33 first image processor
34 first control processor
35 first CAN transceiver
36 first communication interface
37 heater
38 cleaner
41 second optical system
42 second image sensor
43 second image processor
44 second control processor
45 second CAN transceiver
46 second communication interface
51 first receiver
52 second receiver
53 controller
54 transmitter

The invention claimed is:

1. An image processing apparatus comprising:
a first receiver configured to receive a first image from an outdoor camera;
a second receiver configured to receive a second image from an indoor camera, the second image having an imaging range that includes at least a portion of an imaging range of the first image; and
a controller configured to determine an abnormality in the first image or the second image based on a common portion in the imaging ranges of the first image and the second image and using an image characteristic ratio indicating a difference between luminance distribution of the common portion of the first image and luminance distribution of the common portion of the second image.

2. The image processing apparatus according to claim 1, wherein the first receiver is configured to receive the first image generated by capturing a subject without passing through an optical member, and
a second receiver is configured to receive the second image generated by capturing the subject via the optical member.

3. The image processing apparatus according to claim 1, wherein the image characteristic ratio is based on a first image characteristic value indicating a characteristic of the common portion in the first image and a second image characteristic value indicating a characteristic of the common portion in the second image.

4. The image processing apparatus according to claim 3, wherein the first image characteristic value is a first distribution width indicating a distribution width of a pixel characteristic value of the first image, the second image characteristic value is a second distribution width indicating a distribution width of a pixel characteristic value of the second image, and the pixel characteristic value indicates a predetermined characteristic of each pixel, and the controller is configured to obtain a ratio of the first distribution width to the second distribution width as the image characteristic ratio.

5. The image processing apparatus according to claim 3, wherein the first image characteristic value is a first maximum frequency serving as a maximum frequency value in a distribution of a pixel characteristic value of the first image, the second image characteristic value is a second maximum frequency serving as a maximum frequency value in a distribution of a pixel characteristic value of the second image, and the pixel characteristic value indicates a predetermined characteristic of each pixel, and the controller is configured to obtain a ratio of the second maximum frequency to the first maximum frequency as the image characteristic ratio.

6. The image processing apparatus according to claim 3, wherein the first image characteristic value is a first edge width serving as a width of an edge calculated in the first image, and the second image characteristic value is a second edge width serving as a width of an edge calculated in the second image and corresponding to the edge calculated in the first image, and the controller is configured to obtain a ratio of the second edge width to the first edge width as the image characteristic ratio.

7. The image processing apparatus according to claim 6, wherein, when a pixel characteristic value is a value indicating a predetermined characteristic of each pixel, each of the first edge width and the second edge width is a width of a region in an edge region including a region in which the pixel characteristic value varies.

8. The image processing apparatus according to claim 7, wherein the region in which the pixel characteristic value varies is a region in which the pixel characteristic value in the edge region falls between a lowest characteristic value larger than a minimum value of the pixel characteristic value in the edge region and a highest characteristic value smaller than a maximum pixel characteristic value in the edge region.

9. The image processing apparatus according to claim 3, wherein the first image characteristic value is a first edge level indicating a difference between a maximum pixel characteristic value and a minimum pixel characteristic value in a region in which a change ratio of a pixel characteristic value in a direction intersecting an edge in an edge region including the edge extracted from the first image is equal to or larger than a predetermined value, the second image characteristic value is a second edge level indicating a difference between the maximum pixel characteristic value and the minimum pixel characteristic value in a region in which a change ratio of the pixel characteristic value in a direction intersecting an edge in a region of the second image corresponding to the edge region of the first image is equal to or larger than a predetermined value, and the pixel characteristic value indicates a predetermined characteristic of each pixel; and the controller is configured to obtain a ratio of the first edge level to the second edge level as the image characteristic ratio.

10. The image processing apparatus according to claim 4, wherein, when the image characteristic ratio is equal to or smaller than a first value that is between 0 and 1, the controller is configured to determine that there is an abnormality in the first image and perform foreign substance removal control for removing a foreign substance attached to an optical system of a first imaging apparatus that has generated the first image.

11. The image processing apparatus according to claim 10, wherein the controller is configured to perform the foreign substance removal control by cleaning or heating the first imaging apparatus.

12. The image processing apparatus according to claim 10, wherein, when the image characteristic ratio is equal to or smaller than a second value lower than the first value, the controller is configured to determine that there is an abnormality in the first imaging apparatus configured to generate the first image.

13. The image processing apparatus according to claim 4, wherein, when the controller determines that an image characteristic ratio is equal to or larger than a first value that is larger than 1, the controller is further configured to determine that there is an abnormality in the second image and perform foreign substance removal control for removing a foreign substance attached to a member that transmits light to reach an image sensor of a second imaging apparatus that has generated the second image.

14. The image processing apparatus according to claim 13, wherein the controller is configured to perform the foreign substance removal control by cleaning or heating the member.

15. The image processing apparatus according to claim 13, wherein, when an image characteristic ratio is equal to or larger than a second value higher than the first value, the controller is configured to determine that there is an abnormality in a second imaging apparatus configured to generate the second image.

16. The image processing apparatus according to claim 4, wherein the pixel characteristic value is luminance, saturation, or brightness.

17. The image processing apparatus according to claim 1, wherein the controller further includes a transmitter, the transmitter configured to transmit an image based on the second image to a first display apparatus, to which the first image is transmitted when there is no abnormality in the first image, when it is determined that there is an abnormality in the first image, and transmit an image based on the first image to a second display apparatus, to which the second image is transmitted when there is no abnormality in the second image, when it is determined that there is an abnormality in the second image.

18. An imaging system comprising;

a first imaging apparatus configured to generate a first image, the first imaging apparatus being positioned in an outdoor location;

a second imaging apparatus configured to generate a second image having an imaging range that includes at least a portion of an imaging range of the first image, the second imaging apparatus being positioned in an indoor location; and an image processing apparatus including
- a first receiver configured to receive the first image,
- a second receiver configured to receive the second image, and
- a controller configured to determine an abnormality in the first image or the second image based on a common portion in the imaging ranges of the first image and the second image and using an image characteristic ratio indicating a difference between luminance distribution of the common portion of the first image and luminance distribution of the common portion of the second image.

19. A mobile body comprising:
- a first imaging apparatus configured to generate a first image, the first imaging apparatus being positioned in an outdoor location;
- a second imaging apparatus configured to generate a second image having an imaging range that includes at least a portion of an imaging range of the first image, the second imaging apparatus positioned in an indoor location; and
- an image processing apparatus including
  - a first receiver configured to receive the first image,
  - a second receiver configured to receive the second image, and
  - a controller configured to determine an abnormality in the first image or the second image based on a common portion in the imaging ranges of the first image and the second image and using an image characteristic ratio indicating a difference between luminance distribution of the common portion of the first image and luminance distribution of the common portion of the second image.

20. An image processing method performed by an image processing apparatus, the image processing method comprising:
- receiving a first image from an outdoor camera;
- receiving a second image from an indoor camera, the second image having an imaging range that includes at least a portion of an imaging range of the first image; and
- determining an abnormality in the first image or the second image based on a common portion in the imaging ranges of the first image and the second image and using an image characteristic ratio indicating a difference between luminance distribution of the common portion of the first image and luminance distribution of the common portion of the second image.

* * * * *